US 12,041,249 B2

(12) United States Patent
Wang et al.

(10) Patent No.: US 12,041,249 B2
(45) Date of Patent: Jul. 16, 2024

(54) MIXED NAL UNIT PICTURE CONSTRAINTS IN VIDEO CODING

(71) Applicant: Huawei Technologies Co., Ltd., Shenzhen (CN)

(72) Inventors: Ye-Kui Wang, San Diego, CA (US); FNU Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 17/568,517

(22) Filed: Jan. 4, 2022

(65) Prior Publication Data

US 2022/0132148 A1 Apr. 28, 2022

Related U.S. Application Data

(63) Continuation of application No. PCT/US2020/041035, filed on Jul. 7, 2020.
(Continued)

(51) Int. Cl.
*H04N 19/169* (2014.01)
*H04N 19/105* (2014.01)
(Continued)

(52) U.S. Cl.
CPC ......... *H04N 19/188* (2014.11); *H04N 19/105* (2014.11); *H04N 19/107* (2014.11);
(Continued)

(58) Field of Classification Search
None
See application file for complete search history.

(56) References Cited

U.S. PATENT DOCUMENTS 10,645,404 B2    5/2020  Wang et al.
2009/0323820 A1  12/2009 Wu et al.
(Continued)

FOREIGN PATENT DOCUMENTS

CN    103703782 A    4/2014
CN    105122815 A    12/2015
(Continued)

OTHER PUBLICATIONS

Bross et al., Versatile Video Coding (Draft 5), Mar. 19-27, 2019, Joint Video Experts Team (JVET) of ITU-T SG 16 WP 3 and ISO/IEC JTC 1/SC 29/WG 11,14th Meeting: Geneva, CH. (Year: 2019).*
(Continued)

*Primary Examiner* — James M Anderson, II
(74) *Attorney, Agent, or Firm* — Conley Rose, P.C.

(57) ABSTRACT

A video coding mechanism is disclosed. The mechanism includes receiving a bitstream comprising a current picture including a plurality of video coding layer (VCL) network abstraction layer (NAL) units that do not have a same NAL unit type. Active entries of reference picture lists are obtained for slices positioned in a sub-picture A (subpicA) in subsequent pictures following the current picture in decoding order. The active entries do not refer to any reference picture preceding the current picture in decoding order when the subpicA at the current picture is associated with an intra-random access point (IRAP) NAL unit type. The subsequent pictures are decoded based on the reference picture list active entries. The subsequent pictures are forwarded for display as part of a decoded video sequence.

18 Claims, 12 Drawing Sheets

Related U.S. Application Data

(60) Provisional application No. 62/871,524, filed on Jul. 8, 2019.

(51) Int. Cl.
*H04N 19/107* (2014.01)
*H04N 19/172* (2014.01)
*H04N 19/174* (2014.01)
*H04N 19/70* (2014.01)
*H04N 19/117* (2014.01)

(52) U.S. Cl.
CPC ......... *H04N 19/172* (2014.11); *H04N 19/174* (2014.11); *H04N 19/70* (2014.11); *H04N 19/117* (2014.11)

(56) References Cited

U.S. PATENT DOCUMENTS

| | | | |
|---|---|---|---|
| 2014/0301485 | A1 | 10/2014 | Ramasubramonian et al. |
| 2014/0355692 | A1 | 12/2014 | Ramasubramonian |
| 2015/0110192 | A1 | 4/2015 | Wang et al. |
| 2015/0195572 | A1 | 7/2015 | Chen |
| 2015/0264404 | A1 | 9/2015 | Hannuksela |
| 2016/0219306 | A1 | 7/2016 | Pettersson et al. |
| 2017/0085905 | A1 | 3/2017 | Kadono |
| 2017/0094271 | A1 | 3/2017 | Liu |
| 2017/0105004 | A1 | 4/2017 | Chen et al. |
| 2018/0277164 | A1 | 9/2018 | Wang |
| 2019/0014337 | A1* | 1/2019 | Skupin ................. H04N 19/119 |

FOREIGN PATENT DOCUMENTS

| | | | |
|---|---|---|---|
| CN | 105379271 | A | 3/2016 |
| JP | 2023512749 | A | 3/2023 |
| RU | 2676876 | C2 | 1/2019 |
| WO | 2011129602 | A2 | 10/2011 |
| WO | 2013157828 | A1 | 10/2013 |
| WO | 2018071666 | A1 | 4/2018 |
| WO | 2021116157 | A1 | 6/2021 |

OTHER PUBLICATIONS

Zhong, J., "The characteristics of the new video coding standard H.264 are analyzed," National Center for Science and Technology Books and Literature, 2005, with an English abstract, 4 pages.
"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.
"High Efficiency Video Coding," Series H: Audiovisual and Multimedia Systems Infrastructure of Audiovisual Services—Coding of Moving Video, ITU-T H.265, Feb. 2018, 692 pages.
"Line Transmission of Non-Telephone Signals, Video Codec for Audiovisual Services at px64 kbits," ITU-T Recommendation H.261, Mar. 1993, 29 pages.
"Transmission of Non-Telephone Signals, Information Technology—Generic Coding of Moving Pictures and Associated Audio Information: Video," ITU-T H.262, Jul. 1995, 211 pages.
"Video Coding for Low Bit Rate Communication," Series H: Audiovisual and Multimedia Systems Infrastructure of Audiovisual Services—Coding of Moving Video, ITU-T H.263, Jan. 2005, 226 pages.
Bross, et al., "Versatile Video Coding (Draft 5)," Joint Video Experts Team (JVET) of ITU-T SG 16 WP 3 and ISO/IEC ITC 1/SC 29/WG 11, 14th Meeting: Geneva, CH, Mar. 19-27, 2019, JVET-N1001-v10, 407 pages.
Boyce, et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG11, 29th Meeting: Macao, CN, Oct. 19-25, 2017, JCTVC-AC1005-v2, 56 pages.
Wang, et al., "AHG12: On Mixed NAL Unit Types Within a Picture," Joint Video Experts Team (JVET) of ITU-T-SG 16 WP3 and ISO/IEC JTC 1/SC 29/WG 11, 15th Meeting: Gothenburg, SE, Jul. 3-12, 2019, JVET-O0140-v1, 3 pages.
Document: JVET-N0108-v1, Wang, Y-K., et al., "AHG12: Allowing mixed IRAP and non-IRAP NAL unit types within a picture," Joint Video Experts Team (JVET) of ITU-T SG 16 WP 3 and ISO/IECJTC 1/SC 29/WG11, 14th Meeting: Geneva, CH, Mar. 19-27, 2019, 3 pages.
Document: JVET-M0259, Miska M. Hannuksela et al, "Use cases and proposed design choices for adaptive resolution changing (ARC)," Joint Video Experts Team (JVET) of ITU-T SG 16 WP 3 and ISO/IEC JTC 1/SC 29/WG 11, 13th Meeting: Marrakech, MA, Jan. 9-18, 2019, 10 pages.
Document: JVET-N0047-v1, Hannuksela, M., "AHG12/AHG17: Merging IRAP and non-IRAP VCL NAL units into the same coded picture," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-M0128-v1, Wang, Y.K., et al., "On reference picture management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-N0047, Miska M. Hannuksela et al., "AHG12/AHG17: Merging IRAP and non-IRAP VCL NAL units into the same coded picture," Joint Video Experts Team (JVET) of ITU-T SG 16 WP 3 and ISO/IEC JTC 1/SC 29/WG 11, 14th Meeting: Geneva, CH, Mar. 19-27, 2019, 8 pages.

* cited by examiner

MIXED NAL UNIT PICTURE CONSTRAINTS IN VIDEO CODING

CROSS-REFERENCE TO RELATED APPLICATIONS

This patent application is a continuation of International Application No. PCT/US2020/041035, filed Jul. 7, 2020 by Ye-Kui Wang, et. al., and titled "Mixed NAL Unit Picture Constraints In Video Coding," which claims the benefit of U.S. Provisional Patent Application No. 62/871,524, filed Jul. 8, 2019 by Ye-Kui Wang, et. al., and titled "Constraints for Mixed NAL Unit Types within One Picture in Video Coding," which are hereby incorporated by reference.

TECHNICAL FIELD

The present disclosure is generally related to video coding, and is specifically related to coding sub-pictures of pictures in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a current picture including a plurality of video coding layer (VCL) network abstraction layer (NAL) units that do not have a same NAL unit type; obtaining, by a processor of the decoder, active entries of reference picture lists for slices positioned in a sub-picture A (subpicA) in subsequent pictures following the current picture in decoding order, wherein the active entries do not include a reference to any reference picture preceding the current picture in decoding order when the subpicA at the current picture is associated with an intra-random access point (IRAP) NAL unit type; decoding, by the processor, the subsequent pictures based on the reference picture list active entries; and forwarding, by the processor, the subsequent pictures for display as part of a decoded video sequence.

Video coding systems may encode video by employing IRAP pictures and non-IRAP pictures. IRAP pictures are pictures coded according to intra-prediction that serve as random access points for a video sequence. The IRAP picture can be decoded without first decoding any other pictures. Accordingly, a decoder can begin decoding a video sequence at any IRAP picture. In contrast, a decoder is generally unable to begin decoding a video sequence at a non-IRAP picture. IRAP pictures may also refresh the DPB. This is because the IRAP picture can act as a starting point for a coded video sequence (CVS), and pictures in the CVS do not refer to pictures in the prior CVS. As such, IRAP pictures can also break/stop inter-prediction chains and stop inter-prediction related coding errors because such errors cannot propagate through the IRAP picture.

In some cases, video coding systems may be employed to code virtual reality (VR) video. A VR video may include a sphere of video content displayed as if the user is in the center of the sphere. Only a portion of the sphere, referred to as a viewport, is displayed to the user. The remainder of the picture is discarded without being rendered. The entire picture is generally transmitted so that a different viewport can be dynamically selected and displayed in response to the users head movement. This approach may result in very large video file sizes. In order to improve coding efficiency, some systems divide the pictures into sub-pictures. The video can be encoded at two or more resolutions. Each resolution is encoded into a different set of sub-bitstreams corresponding to the sub-pictures. When a user streams the VR video, the coding system can merge the sub-bitstreams into a bitstream for transmission based on the current viewport in use by the user. Specifically, the current viewport is obtained from the high resolution sub-bitstream and the viewports that are not being viewed are obtained from the low resolution bitstream(s). In this way, the highest quality video is displayed to the user and the lower quality video is discarded. In the event the user selects a new viewport, the lower resolution video is presented to the user. The decoder can request that the new viewport receive the higher resolution video. The encoder can then alter the merging process accordingly. Once an TRAP picture is reached, the decoder can begin decoding the higher resolution video sequence at the new viewport. This approach significantly increases video compression without negatively impacting the user's viewing experience.

One concern with the abovementioned approach is that the length of time needed to change resolutions is based on the length of time until an TRAP picture is reached. This is because the decoder is unable to begin decoding a different video sequence at a non-IRAP picture as described above. One approach to reduce such latency is to include more TRAP pictures. However, this results in an increase in file size. In order to balance functionality with coding efficiency, different viewports/sub-pictures may include TRAP pictures at different frequencies. For example, viewports that are more likely to be viewed may have more TRAP pictures than other viewports. This approach leads to other problems. Specifically, pictures following an TRAP picture are constrained to not reference pictures that precede the TRAP picture. However, this constraint is made at the picture level. A picture that includes mixed NAL units including both TRAP and non-IRAP sub-pictures may not be considered an TRAP picture at the picture level. Accordingly, such picture level constraints may not apply. This could lead to portions of pictures that follow the TRAP sub-picture improperly referencing pictures that precede the TRAP picture. In this case, the TRAP sub-picture would not function properly as an access point because the reference picture/sub-picture may be unavailable, which would prevent the sub-pictures following the TRAP sub-picture from being decodable. Further, the TRAP sub-picture should not prevent the non-IRAP sub-picture from such referencing as doing so would defeat the purpose of having mixed NAL units (e.g., inter-coded sequences of different lengths depending on sub-picture position).

The present example includes mechanisms to mitigate coding errors when pictures include both TRAP NAL units and non-IRAP NAL units. Specifically, a sub-picture at a current picture may contain an TRAP NAL unit. When this occurs, slices at a picture following the current picture that are also contained in the sub-picture are constrained from referencing reference pictures preceding the current picture. This ensures that the TRAP NAL units stop inter-prediction propagation at the sub-picture level. Accordingly, a decoder can begin decoding at the IRAP sub-picture. Slices associated with the sub-picture in later pictures can always be decoded because such slices do not reference any data that precedes the IRAP sub-picture (which has not been decoded). Such a constraint does not apply to the non-IRAP NAL units. Accordingly, inter-prediction is not broken for the sub-pictures containing non-IRAP data. As such, the disclosed mechanisms allow for the implementation of additional functionality. For example, the disclosed mechanisms support dynamic resolution changes at the sub-picture level when employing sub-picture bitstreams. Hence, the disclosed mechanisms allow for lower resolution sub-picture bitstreams to be transmitted when streaming VR video without significantly impairing user experience. Accordingly, the disclosed mechanisms increase coding efficiency, and hence reduce the usage of network resources, memory resources, and/or processing resources at the encoder and the decoder.

Optionally, in any of the preceding aspects, another implementation of the aspect provides, wherein the IRAP NAL unit type is a clean random access (CRA) NAL unit type.

Optionally, in any of the preceding aspects, another implementation of the aspect provides, wherein the IRAP NAL unit type is an instantaneous decoder refresh (IDR) NAL unit type.

Optionally, in any of the preceding aspects, another implementation of the aspect provides, further comprising determining, by the processor, that all slices of the current picture positioned in subpicA are associated with the same NAL unit type.

Optionally, in any of the preceding aspects, another implementation of the aspect provides, further comprising determining, by the processor, a first NAL unit type value for the VCL NAL units of the current picture is different than a second NAL unit type value for VCL NAL units of the current picture based on a flag.

Optionally, in any of the preceding aspects, another implementation of the aspect provides, wherein the bitstream includes a picture parameter set (PPS), and wherein the flag is obtained from the PPS.

Optionally, in any of the preceding aspects, another implementation of the aspect provides, wherein the flag is a mixed_nalu_types_in_pic_flag, and wherein the mixed_nalu_types_in_pic_flag is equal to one when specifying that each picture referring to the PPS has more than one VCL NAL unit and the VCL NAL units do not have the same value of NAL unit type (nal_unit_type).

In an embodiment, the disclosure includes a method implemented in an encoder, the method comprising: determining, by a processor of the encoder, that a current picture includes a plurality of VCL NAL units that do not have a same NAL unit type; determining, by the processor, that a subpicA at the current picture is associated with an TRAP NAL unit type; generating, by the processor, active entries of reference picture lists for slices positioned in the subpicA in subsequent pictures following the current picture in decoding order, wherein the active entries do not include a reference to any reference picture preceding the current picture in decoding order when the subpicA at the current picture is associated with the TRAP NAL unit type; encoding, by the processor, the subsequent pictures into a bitstream based on the reference picture lists; and storing, by a memory coupled to the processor, the bitstream for communication toward a decoder.

Video coding systems may encode video by employing IRAP pictures and non-IRAP pictures. IRAP pictures are pictures coded according to intra-prediction that serve as random access points for a video sequence. The IRAP picture can be decoded without first decoding any other pictures. Accordingly, a decoder can begin decoding a video sequence at any IRAP picture. In contrast, a decoder is generally unable to begin decoding a video sequence at a non-IRAP picture. IRAP pictures may also refresh the DPB. This is because the IRAP picture can act as a starting point for a coded video sequence (CVS), and pictures in the CVS do not refer to pictures in the prior CVS. As such, IRAP pictures can also break inter-prediction chains and stop inter-prediction related coding errors because such errors cannot propagate through the IRAP picture.

In some cases, video coding systems may be employed to code virtual reality (VR) video. A VR video may include a sphere of video content displayed as if the user is in the center of the sphere. Only a portion of the sphere, referred to as a viewport, is displayed to the user. The remainder of the picture is discarded without being rendered. The entire picture is generally transmitted so that a different viewport can be dynamically selected and displayed in response to the users head movement. This approach may result in very large video file sizes. In order to improve coding efficiency, some systems divide the pictures into sub-pictures. The video can be encoded at two or more resolutions. Each resolution is encoded into a different set of sub-bitstreams corresponding to the sub-pictures. When a user streams the VR video, the coding system can merge the sub-bitstreams into a bitstream for transmission based on the current viewport in use by the user. Specifically, the current viewport is obtained from the high resolution sub-bitstream and the viewports that are not being viewed are obtained from the low resolution bitstream(s). In this way, the highest quality video is displayed to the user and the lower quality video is discarded. In the event the user selects a new viewport, the lower resolution video is presented to the user. The decoder can request that the new viewport receive the higher resolution video. The encoder can then alter the merging process accordingly. Once an IRAP picture is reached, the decoder can begin decoding the higher resolution video sequence at the new viewport. This approach significantly increases video compression without negatively impacting the user's viewing experience.

One concern with the abovementioned approach is that the length of time needed to change resolutions is based on the length of time until an IRAP picture is reached. This is because the decoder is unable to begin decoding a different video sequence at a non-IRAP picture as described above. One approach to reduce such latency is to include more TRAP pictures. However, this results in an increase in file size. In order to balance functionality with coding efficiency, different viewports/sub-pictures may include TRAP pictures at different frequencies. For example, viewports that are more likely to be viewed may have more TRAP pictures than other viewports. This approach leads to other problems.

Specifically, pictures following an TRAP picture are constrained to not reference pictures that precede the IRAP picture. However, this constraint is made at the picture level. A picture that includes mixed NAL units including both TRAP and non-IRAP sub-pictures may not be considered an TRAP picture at the picture level. Accordingly, such picture level constraints may not apply. This could lead to portions of pictures that follow the TRAP sub-picture improperly referencing pictures that precede the TRAP picture. In this case, the TRAP sub-picture would not function properly as an access point because the reference picture/sub-picture may be unavailable, which would prevent the sub-pictures following the TRAP sub-picture from being decodable. Further, the TRAP sub-picture should not prevent the non-IRAP sub-picture from such referencing as doing so would defeat the purpose of having mixed NAL units (e.g., inter-coded sequences of different lengths depending on sub-picture position).

The present example includes mechanisms to mitigate coding errors when pictures include both TRAP NAL units and non-IRAP NAL units. Specifically, a sub-picture at a current picture may contain an TRAP NAL unit. When this occurs, slices at a picture following the current picture that are also contained in the sub-picture are constrained from referencing reference pictures preceding the current picture. This ensures that the TRAP NAL units stop inter-prediction propagation at the sub-picture level. Accordingly, a decoder can begin decoding at the IRAP sub-picture. Slices associated with the sub-picture in later pictures can always be decoded because such slices do not reference any data that precedes the IRAP sub-picture (which has not been decoded). Such a constraint does not apply to the non-IRAP NAL units. Accordingly, inter-prediction is not broken for the sub-pictures containing non-IRAP data. As such, the disclosed mechanisms allow for the implementation of additional functionality. For example, the disclosed mechanisms support dynamic resolution changes at the sub-picture level when employing sub-picture bitstreams. Hence, the disclosed mechanisms allow for lower resolution sub-picture bitstreams to be transmitted when streaming VR video without significantly impairing user experience. Accordingly, the disclosed mechanisms increase coding efficiency, and hence reduce the usage of network resources, memory resources, and/or processing resources at the encoder and the decoder.

Optionally, in any of the preceding aspects, another implementation of the aspect provides, wherein the TRAP NAL unit type is a CRA NAL unit type.

Optionally, in any of the preceding aspects, another implementation of the aspect provides, wherein the TRAP NAL unit type is an IDR NAL unit type.

Optionally, in any of the preceding aspects, another implementation of the aspect provides, further comprising encoding into the bitstream, by the processor, the current picture by ensuring that all slices of the current picture positioned in subpicA are associated with the same NAL unit type.

Optionally, in any of the preceding aspects, another implementation of the aspect provides, further comprising encoding into the bitstream, by the processor, a flag indicating a first NAL unit type value for the VCL NAL units of the current picture is different than a second NAL unit type value for VCL NAL units of the current picture.

Optionally, in any of the preceding aspects, another implementation of the aspect provides, wherein the flag is encoded into a PPS in the bitstream.

Optionally, in any of the preceding aspects, another implementation of the aspect provides, wherein the flag is a mixed_nalu_types_in_pic_flag, and wherein the mixed_nalu_types_in_pic_flag is set equal to one when specifying that each picture referring to the PPS has more than one VCL NAL unit and the VCL NAL units do not have the same value of nal_unit_type.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a current picture including a plurality of VCL NAL units that do not have a same NAL unit type; an obtaining means for obtaining active entries of reference picture lists for slices positioned in a subpicA in subsequent pictures following the current picture in decoding order; a determining means for determining that the active entries do not include a reference to any reference picture preceding the current picture in decoding order when the subpicA at the current picture is associated with an TRAP NAL unit type; a decoding means for decoding the subsequent pictures based on the reference picture list active entries; and a forwarding means for forwarding the subsequent pictures for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a determining means for: determining that a current picture includes a plurality of VCL NAL units that do not have a same NAL unit type; and determining that a subpicA at the current picture is associated with an IRAP NAL unit type; a generating means for generating active entries of reference picture lists for slices positioned in the subpicA in subsequent pictures following the current picture in decoding order, wherein the active entries do not include a reference to any reference picture preceding the current picture in decoding order when the subpicA at the current picture is associated with the TRAP NAL unit type; an encoding means for encoding the subsequent pictures into a bitstream based on the reference picture lists; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
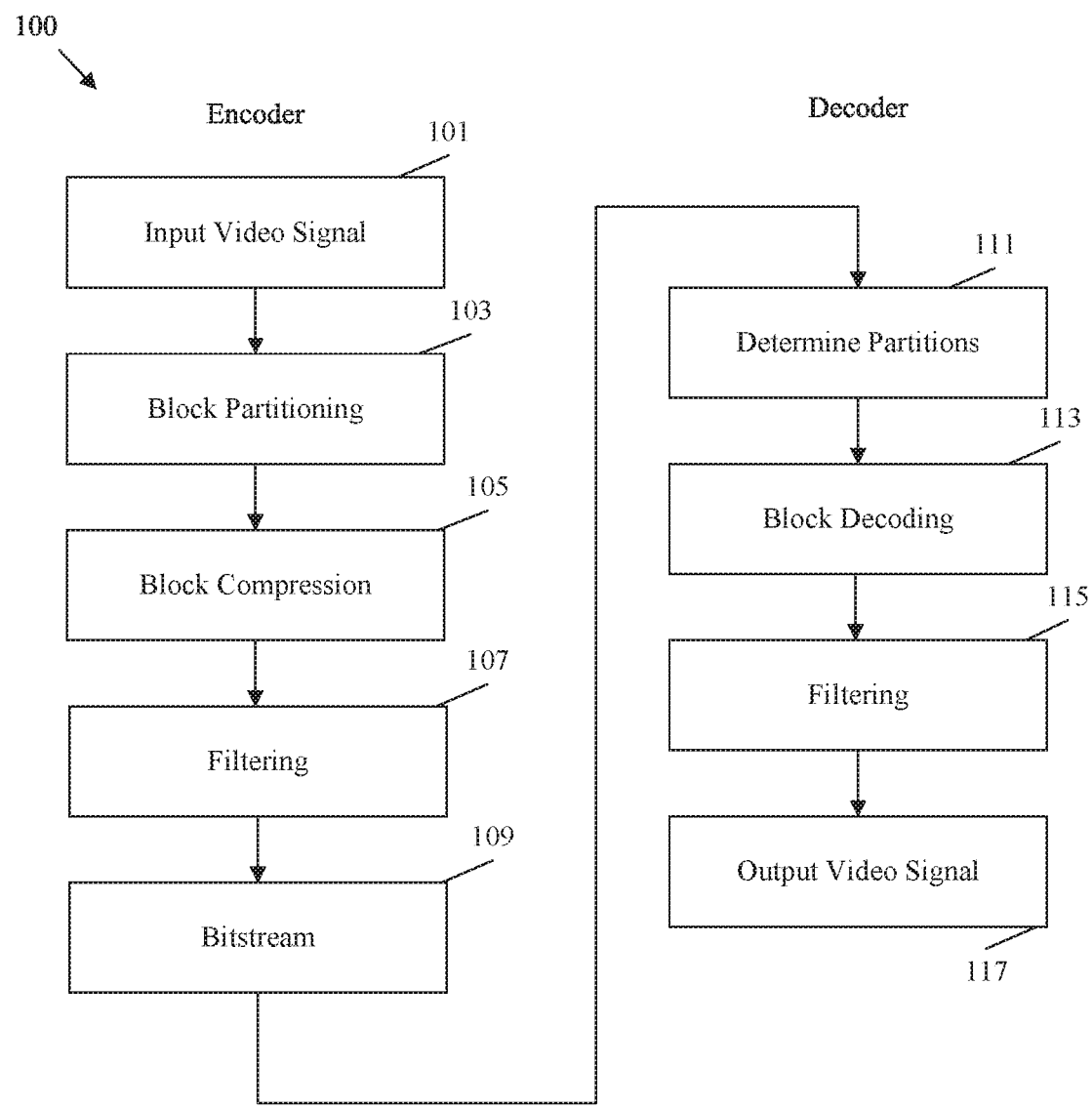
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion, and any picture following the current picture can be referred to as a subsequent picture. A sub-picture is a rectangular region of one or more slices within a sequence of pictures. It should be noted that a square is a type of rectangle, and hence a sub-picture can include a square region. A slice is an integer number of complete tiles or an integer number of consecutive complete coding tree unit (CTU) rows within a tile of a picture that are exclusively contained in a single network abstraction layer (NAL) unit. A NAL unit is a syntax structure containing bytes of data and an indication of the type of data contained therein. NAL units include video coding layer (VCL) NAL units that contain video data and non-VCL NAL units that contain supporting syntax data. A NAL unit type is a type of data structure contained in a NAL unit. An intra-random access point (TRAP) NAL unit type is a data structure containing data from an TRAP picture or sub-picture. An TRAP picture/sub-picture is a picture/sub-picture that is coded according to intra-prediction, which indicates a decoder can begin decoding a video sequence at the corresponding picture/sub-picture without referencing pictures preceding the IRAP picture/sub-picture. A clean random access (CRA) NAL unit type is a data structure containing data from a CRA picture or sub-picture. A CRA picture/sub-picture is an TRAP picture/sub-picture that does not refresh a decoded picture buffer (DPB). An instantaneous decoding refresh (IDR) NAL unit type is a data structure containing data from an IDR picture or sub-picture. An IDR picture/sub-picture is an TRAP picture/sub-picture that refreshes a DPB. A reference picture is a picture that contains reference samples that can be used when coding other pictures by reference according to inter-prediction. A reference picture list is a list of reference pictures used for inter-prediction and/or inter-layer prediction. Some video coding systems reference two picture lists, which can be denoted as reference picture list one and reference picture list zero. A reference picture list structure is an addressable syntax structure that contains multiple reference picture lists. An active entry is an entry in a reference picture list that refers to reference pictures that are available for use by a current picture when performing inter-prediction. A flag is a data structure containing a sequence of bits that can be set to indicate corresponding data. A picture parameter set (PPS) is a parameter set that contains picture level data related to one or more pictures. A decoding order is an order in which syntax elements are processed by a decoding process. A decoded video sequence is a sequence of pictures that have been reconstructed by a decoder in preparation for display to a user.

The following acronyms are used herein, Coded Video Sequence (CVS), Decoded Picture Buffer (DPB), Instantaneous Decoding Refresh (IDR), Intra-Random Access Point (TRAP), Least Significant Bit (LSB), Most Significant Bit (MSB), Network Abstraction Layer (NAL), Picture Order Count (POC), Raw Byte Sequence Payload (RBSP), Sequence Parameter Set (SPS), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-N1001-v10.

Video coding systems may encode video by employing IRAP pictures and non-IRAP pictures. IRAP pictures are pictures coded according to intra-prediction that serve as random access points for a video sequence. In intra-prediction, blocks of a picture are coded by reference to other blocks in the same picture. This is in contrast to non-IRAP pictures that employ inter-prediction. In inter-prediction, blocks of a current picture are coded by reference to other blocks in a reference picture that is different from the current picture. Since an IRAP picture is coded without reference to other pictures, the IRAP picture can be decoded without first decoding any other pictures. Accordingly, a decoder can begin decoding a video sequence at any IRAP picture. In contrast, a non-IRAP picture is coded in reference to other pictures, and hence a decoder is generally unable to begin decoding a video sequence at a non-IRAP picture. IRAP pictures may also refresh the DPB. This is because the IRAP picture can act as a starting point for a CVS, and pictures in the CVS do not refer to pictures in the prior CVS. As such, IRAP pictures can also stop inter-prediction related coding errors because such errors cannot propagate through the IRAP picture. However, IRAP pictures are significantly larger than non-IRAP pictures from a data size standpoint. As such, a video sequence generally includes many non-IRAP pictures with a smaller number of interspersed IRAP pictures to balance coding efficiency with functionality. For example, a sixty frame CVS may include one IRAP picture and fifty nine non-IRAP pictures.

In some cases, video coding systems may be employed to code virtual reality (VR) video, which may also be referred to as three hundred sixty degree video. A VR video may include a sphere of video content displayed as if the user is in the center of the sphere. Only a portion of the sphere, referred to as a viewport, is displayed to the user. For example, the user may employ a head mounted display (HMD) that selects and displays a viewport of the sphere based on the user's head movement. This provides the impression of being physically present in a virtual space as depicted by the video. In order to accomplish this result, each picture of the video sequence includes an entire sphere of video data at a corresponding instant in time. However, only a small portion (e.g., a single viewport) of the picture is displayed to the user. The remainder of the picture is discarded without being rendered. The entire picture is generally transmitted so that a different viewport can be dynamically selected and displayed in response to the users head movement. This approach may result in very large video file sizes.

In order to improve coding efficiency, some systems divide the pictures into sub-pictures. A sub-picture is a defined spatial region of a picture. Each sub-picture contains a corresponding viewport of the picture. The video can be encoded at two or more resolutions. Each resolution is encoded into a different sub-bitstream. When a user streams the VR video, the coding system can merge the sub-bitstreams into a bitstream for transmission based on the current viewport in use by the user. Specifically, the current viewport is obtained from the high resolution sub-bitstream and the viewports that are not being viewed are obtained from the low resolution bitstream(s). In this way, the highest quality video is displayed to the user and the lower quality video is discarded. In the event the user selects a new viewport, the lower resolution video is presented to the user. The decoder can request that the new viewport receive the higher resolution video. The encoder can then alter the merging process accordingly. Once an TRAP picture is reached, the decoder can begin decoding the higher resolution video sequence at the new viewport. This approach significantly increases video compression without negatively impacting the user's viewing experience.

One concern with the abovementioned approach is that the length of time needed to change resolutions is based on the length of time until an TRAP picture is reached. This is because the decoder is unable to begin decoding a different video sequence at a non-IRAP picture as described above. One approach to reduce such latency is to include more TRAP pictures. However, this results in an increase in file size. In order to balance functionality with coding efficiency, different viewports/sub-pictures may include TRAP pictures at different frequencies. For example, viewports that are more likely to be viewed may have more TRAP pictures than other viewports. For example, in a basketball context, the viewports related to the baskets and/or center court may include IRAP pictures at a greater frequency than viewports that view the stands or the ceiling as such viewports are less likely to be viewed by the user.

This approach leads to other problems. Specifically, pictures following an IRAP picture are constrained to not reference pictures that precede the IRAP picture. However, this constraint is made at the picture level. A picture that includes mixed NAL units including both IRAP and non-IRAP sub-pictures may not be considered an IRAP picture at the picture level. Accordingly, such picture level constraints may not apply. This could lead to portions of pictures that follow the IRAP sub-picture improperly referencing pictures that precede the IRAP picture. In this case, the IRAP sub-picture would not function properly as an access point because the reference picture/sub-picture may be unavailable, which would prevent the sub-pictures following the IRAP sub-picture from being decodable. Further, the IRAP sub-picture should not prevent the non-IRAP sub-picture from such referencing as doing so would defeat the purpose of having mixed NAL units (e.g., inter-coded sequences of different lengths depending on sub-picture position).

Disclosed herein are mechanisms to mitigate coding errors when pictures include both IRAP NAL units and non-IRAP NAL units. Specifically, a sub-picture at a current picture may contain an IRAP NAL unit. When this occurs, slices at a picture following the current picture that are also contained in the sub-picture are constrained from referencing reference pictures preceding the current picture. This ensures that the IRAP NAL units break inter-prediction (e.g., stop inter-prediction reference chains) at the sub-picture level. Accordingly, a decoder can begin decoding at the IRAP sub-picture. Slices associated with the sub-picture in later pictures can always be decoded because such slices do not reference any data that precedes the IRAP sub-picture (which has not been decoded). Such a constraint does not apply to the non-IRAP NAL units. Accordingly, inter-prediction is not broken for the sub-pictures containing non-IRAP data. As such, the disclosed mechanisms allow for the implementation of additional functionality. For example, the disclosed mechanisms support dynamic resolution changes at the sub-picture level when employing sub-picture bitstreams. Hence, the disclosed mechanisms allow for lower resolution sub-picture bitstreams to be transmitted when streaming VR video without significantly impairing user experience. Accordingly, the disclosed mechanisms increase coding efficiency, and hence reduce the usage of network resources, memory resources, and/or processing resources at the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
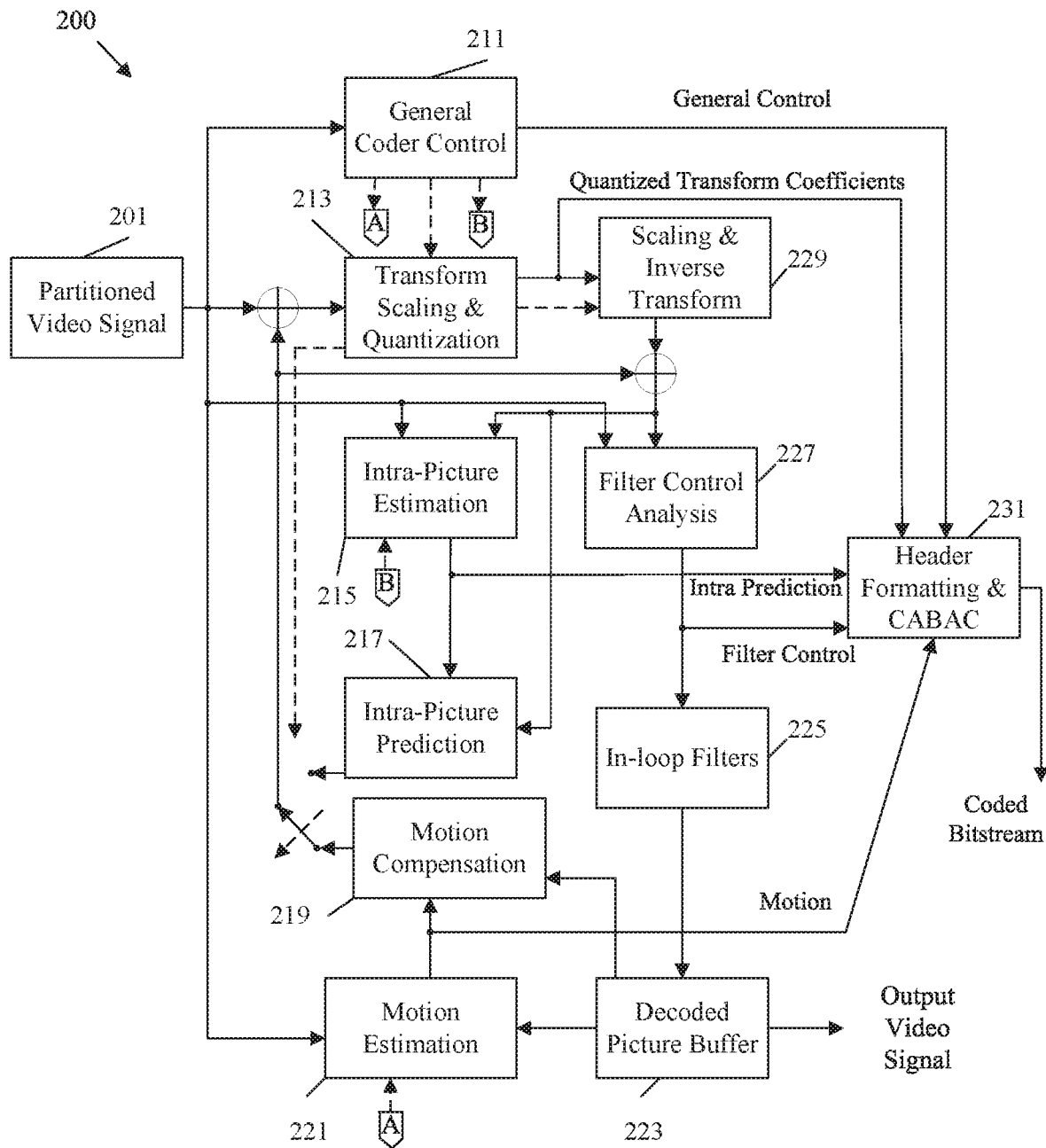
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
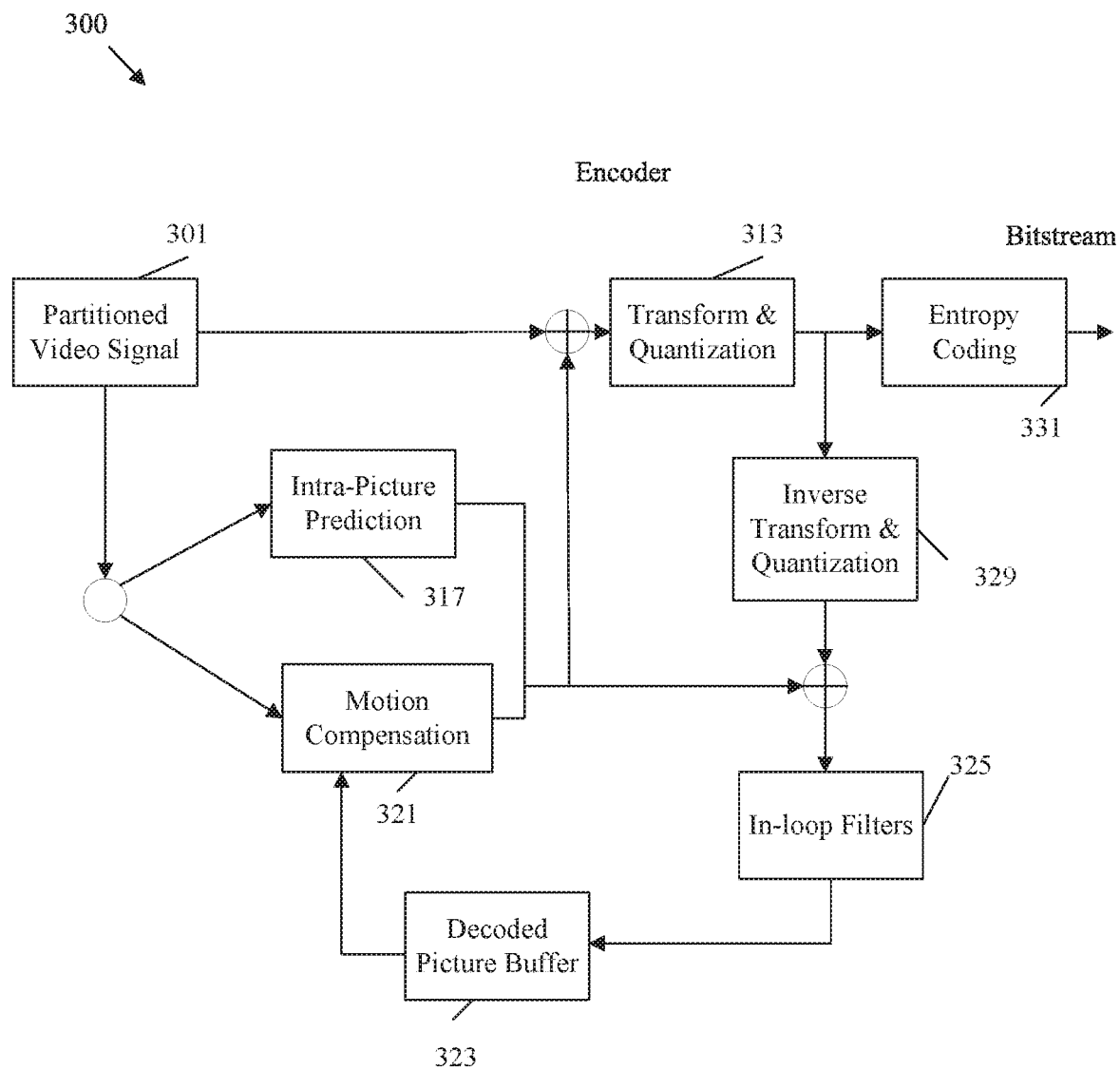
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
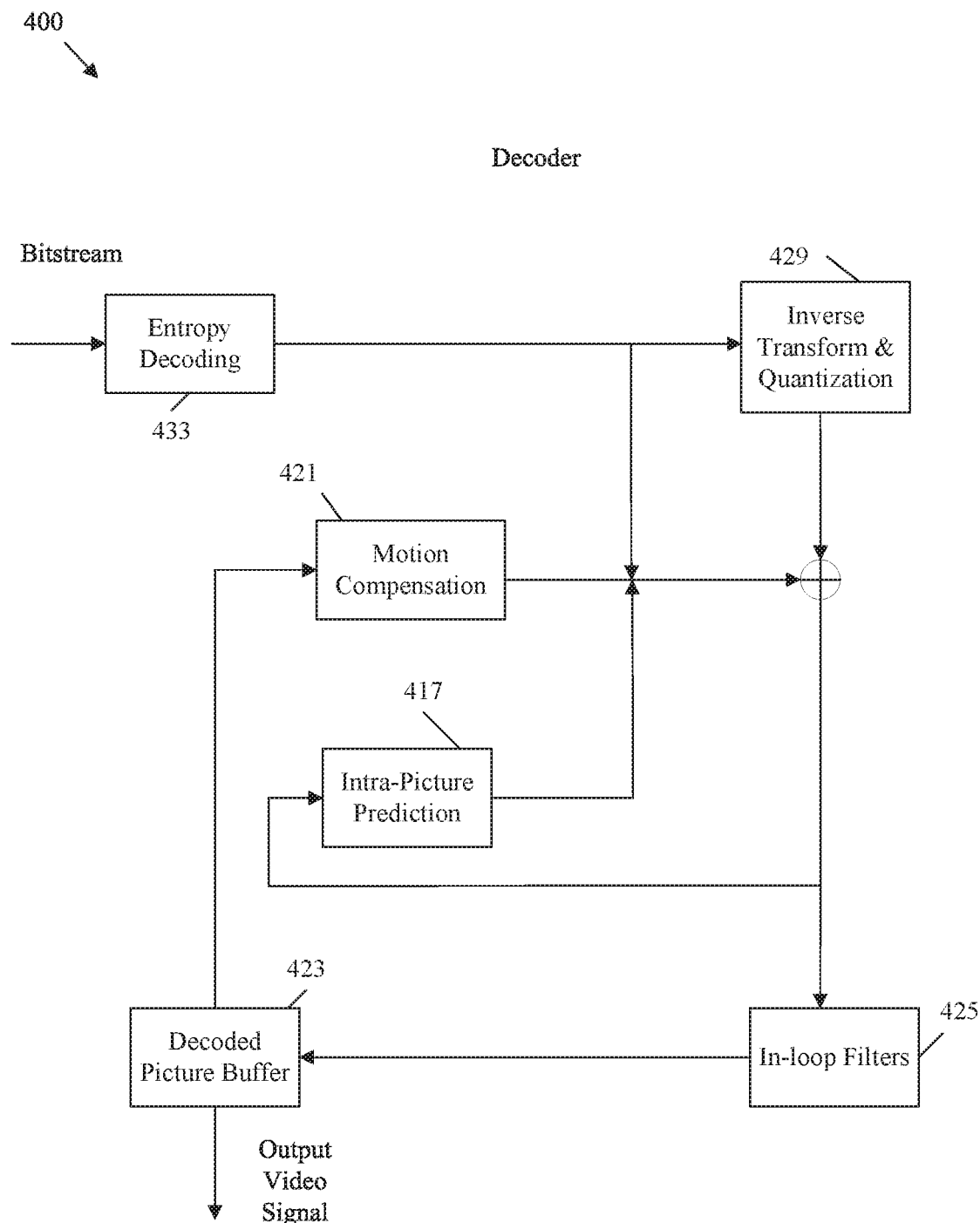
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
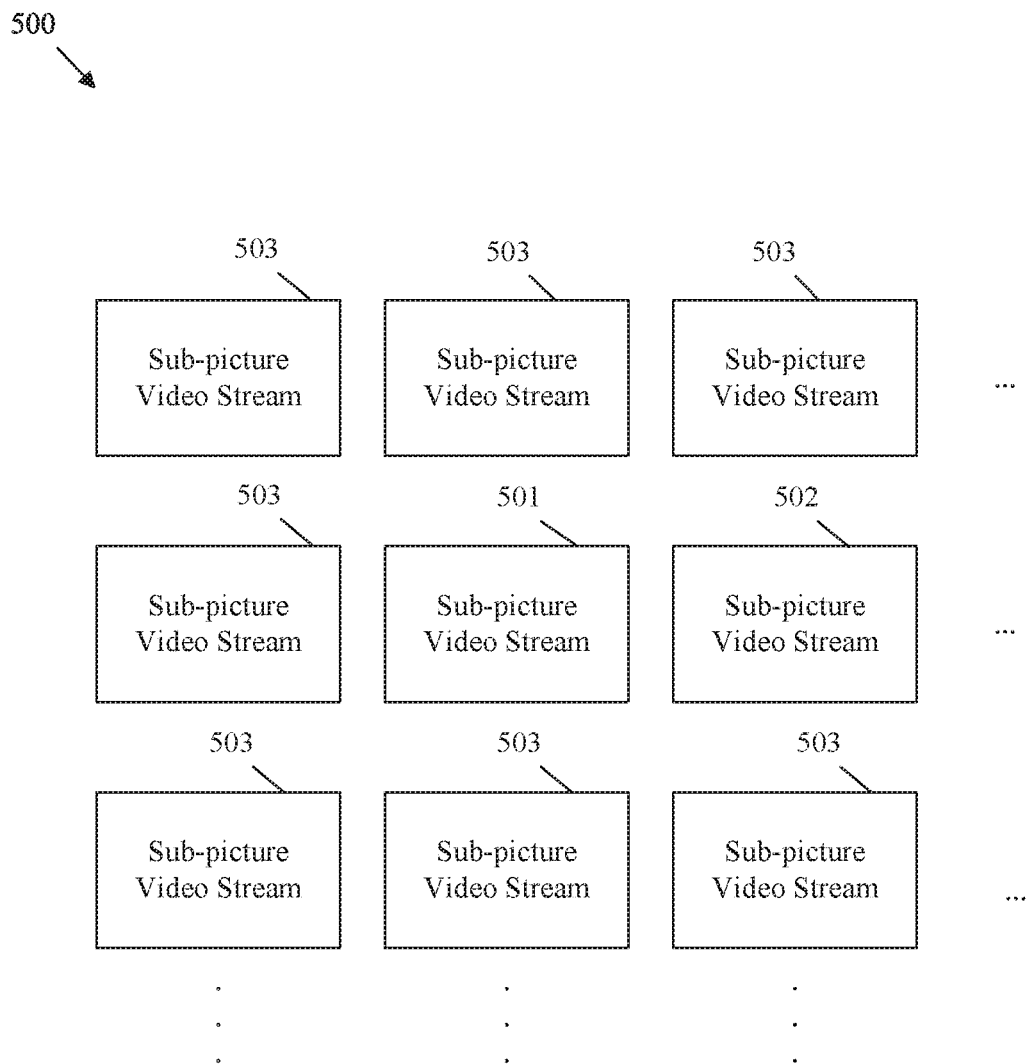
FIG. 5 is a schematic diagram illustrating a plurality of sub-picture video streams split from a virtual reality (VR) picture video stream.

FIG. 5 is a schematic diagram illustrating a plurality of sub-picture video streams 501, 502, and 503 split from a VR picture video stream 500. For example, the sub-picture video streams 501-503 and/or the VR picture video stream 500 may be encoded by an encoder, such as codec system 200 and/or encoder 300, according to method 100. Further, the sub-picture video streams 501-503 and/or the VR picture video stream 500 may be decoded by a decoder, such as codec system 200 and/or decoder 400.

A VR picture video stream 500 includes a plurality of pictures presented over time. Specifically, VR operates by coding a sphere of video content, which can be displayed as if the user is in the center of the sphere. Each picture includes the entire sphere. Meanwhile, only a portion of the picture, known as a viewport, is displayed to the user. For example, the user may employ a head mounted display (HMD) that selects and displays a viewport of the sphere based on the user's head movement. This provides the impression of being physically present in a virtual space as depicted by the video. In order to accomplish this result, each picture of the video sequence includes an entire sphere of video data at a corresponding instant in time. However, only a small portion (e.g., a single viewport) of the picture is displayed to the user. The remainder of the picture is discarded without being rendered. The entire picture is generally transmitted so that a different viewport can be dynamically selected and displayed in response to the users head movement.

In the example shown, the pictures of the VR picture video stream 500 can each be sub-divided into sub-pictures based on available viewports. Accordingly, each picture and corresponding sub-picture includes a picture order count as part of the presentation. Sub-picture video streams 501-503 are created when the sub-division is applied consistently over time. Such consistent sub-division creates sub-picture video streams 501-503 where each stream contains a set of sub-pictures of a predetermined size, shape, and spatial position relative to corresponding pictures in the VR picture video stream 500. Further, the sub-pictures in a sub-picture video stream 501-503 vary in picture order count over the presentation time. As such, the sub-pictures of the sub-picture video streams 501-503 can be aligned based on picture order relative to the presentation time. Then the sub-pictures from the sub-picture video streams 501-503 at each picture order count value can be merged in the spatial domain based on predefined spatial position to reconstruct the VR picture video stream 500 for display. Specifically, the sub-picture video streams 501-503 can each be encoded into separate sub-bitstreams. When such sub-bitstreams are merged together, they result in a bitstream that includes the entire set of pictures over a presentation time. The resulting bitstream can be transmitted toward the decoder for decoding and display based on the user's currently selected viewport.

One of the issues with VR video is that all of the sub-picture video streams 501-503 may be transmitted to a user at a high quality (e.g., high resolution). This allows the decoder to dynamically select the user's current viewport and display the sub-picture(s) from the corresponding sub-picture video streams 501-503 in real time. However, the user may only view a single viewport, for example from sub-picture video stream 501, while sub-picture video streams 502-503 are discarded. As such transmitting sub-picture video streams 502-503 at a high quality may waste a significant amount of bandwidth. In order to improve coding efficiency, the VR video may be encoded into a plurality of video streams 500 where each video stream 500 is encoded at a different quality/resolution. In this way, the decoder can transmit a request for a current sub-picture video stream 501. In response, the encoder (or an intermediate slicer or other content server) can select the higher quality sub-picture video stream 501 from the higher quality video stream 500 and the lower quality sub-picture video streams 502-503 from the lower quality video stream 500. The encoder can then merge such sub-bitstreams together into a complete encoded bitstream for transmission to the decoder. In this way, the decoder receives a series of pictures where the current viewport is higher quality and the other viewports are lower quality. Further, the highest quality sub-pictures are generally displayed to the user (absent head movement) and the lower quality sub-pictures are generally discarded, which balances functionality with coding efficiency.

In the event that the user turns from viewing the sub-picture video stream 501 to the sub-picture video stream 502, the decoder requests the new current sub-picture video stream 502 be transmitted at the higher quality. The encoder can then alter the merging mechanism accordingly. A decoder can only begin decoding a new CVS at an IRAP picture. This is because an IRAP picture is coded according to intra-prediction, which does not reference another picture. Hence, an IRAP picture can be decoded even if pictures that precede the IRAP picture are not available. Non-IRAP pictures are coded according to inter-prediction. As such, the non-IRAP pictures cannot be decoded without first decoding a corresponding set of reference pictures based on a reference picture list. Accordingly, a decoder is generally unable to begin decoding a video sequence at a non-IRAP picture. Due to these constraints, the sub-picture video stream 502 is displayed at the lower quality until an TRAP picture/sub-picture is reached. The IRAP picture can then be decoded at the higher quality to begin the decoding of the higher quality version of the sub-picture video stream 502. This approach significantly increases video compression without negatively impacting the user's viewing experience.

One concern with the abovementioned approach is that the length of time needed to change resolutions is based on the length of time until an TRAP picture is reached in the video stream. This is because the decoder is unable to begin decoding a different version of sub-picture video stream 502 at a non-IRAP picture. One approach to reduce such latency is to include more TRAP pictures. However, this results in an increase in file size. In order to balance functionality with coding efficiency, different viewports/sub-picture video streams 501-503 may include IRAP pictures at different frequencies. For example, viewports/sub-picture video streams 501-503 that are more likely to be viewed may have more TRAP pictures than other viewports/sub-picture video streams 501-503. For example, in a basketball context, the viewports/sub-picture video streams 501-503 related to the baskets and/or center court may include IRAP pictures at a greater frequency than viewports/sub-picture video streams 501-503 that view the stands or the ceiling as such viewports/sub-picture video streams 501-503 are less likely to be viewed by the user.

This approach leads to additional problems. Specifically, the sub-pictures from the sub-picture video streams 501-503 that share a POC are part of a single picture. As noted above, slices from a picture are included in a NAL unit based on picture type. In some video coding systems, all NAL units related to a single picture are constrained to include the same NAL unit type. When different sub-picture video streams 501-503 have TRAP pictures at different frequencies, some of the pictures include both TRAP sub-pictures and non-IRAP sub-pictures. This violates the constraint that each single picture should employ only NAL units of the same type.

This issue can be addressed by removing the constraint that all NAL units for slices in a picture employ the same NAL unit type. For example, a picture is included in an access unit. By removing this constraint, an access unit may include both TRAP NAL unit types and non-IRAP NAL unit types. Further, a flag can be encoded to indicate when a picture/access unit includes a mixture of IRAP NAL unit types and non-IRAP NAL unit types. In some examples, the flag is a mixed NAL unit types in picture flag (mixed_nalu_types_in_pic_flag). In addition, a constraint may be applied to require that a single mixed picture/access unit may only contain one type of IRAP NAL unit and one type of non-IRAP NAL unit. This prevents unintended NAL unit type mixes from occurring. If such mixes were allowed, the decoder would have to be designed to manage such mixes. This would unnecessarily increase the required hardware complexity without providing additional benefit to the coding process. For example, the mixed picture may include one type of IRAP NAL unit selected from IDR_W_RADL, IDR_N_LP, or CRA_NUT. Further, the mixed picture may include one type of non-IRAP NAL unit selected from TRAIL_NUT, RADL_NUT, and RASL_NUT.

Figure 6:
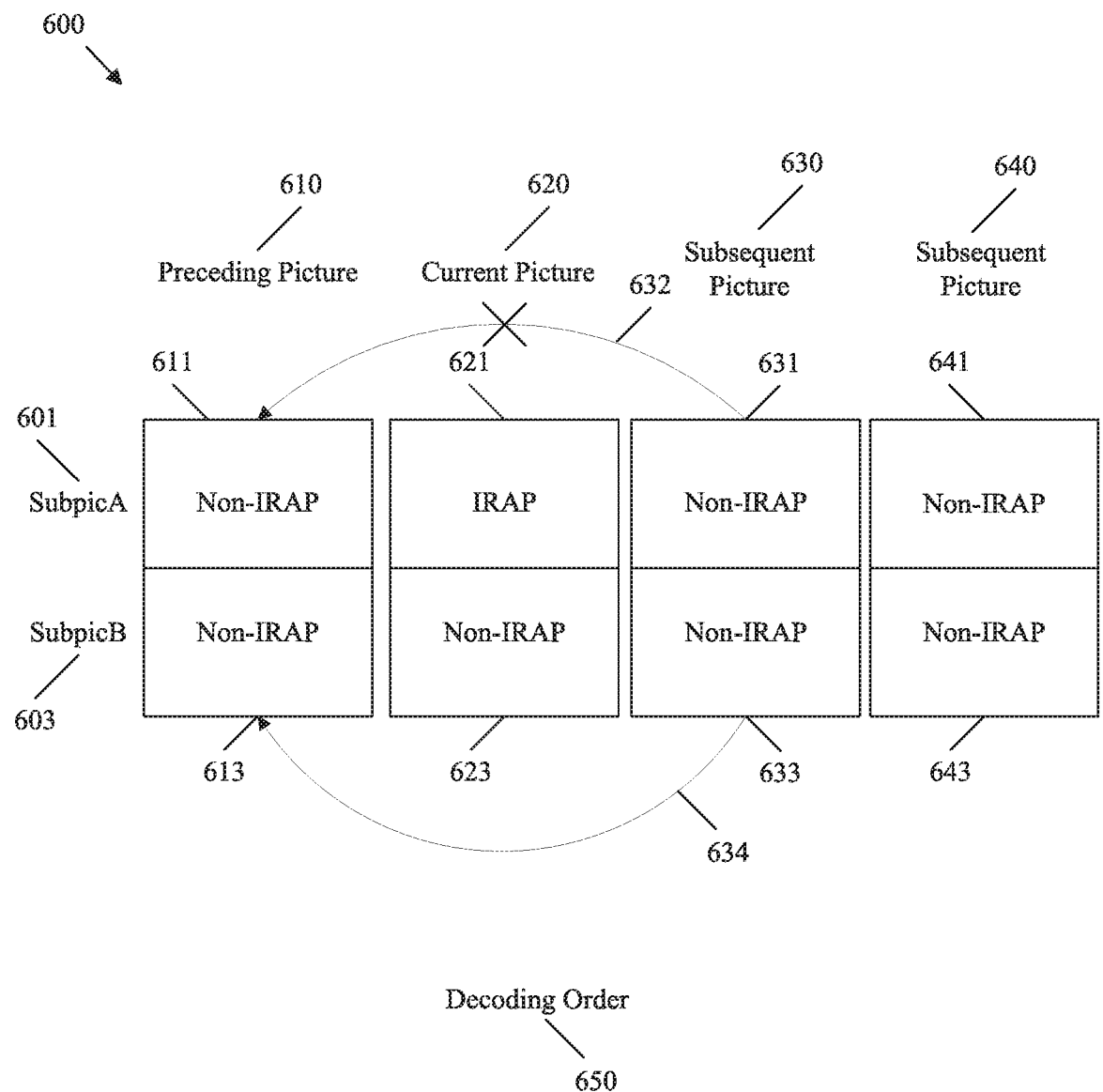
FIG. 6 is a schematic diagram illustrating constraints employed when a current picture includes mixed Network Abstraction Layer (NAL) unit types.

FIG. 6 is a schematic diagram illustrating constraints 600 employed when a current picture includes mixed NAL unit types. The constraints 600 may be applied when coding a VR picture video stream 500. As such, the constraints 600 may be employed by an encoder, such as codec system 200 and/or encoder 300 applying method 100. Further, the constraints 600 may be employed by a decoder, such as codec system 200 and/or decoder 400 applying method 100. A constraint 600 is a requirement imposed on video data, imposed on supporting parameters, and/or imposed on a process related to coding and/or decoding video data.

Specifically, FIG. 6 depicts a series of pictures that have been divided into sub-pictures. The sub-pictures are denoted as sub-picture A (subpicA) 601 and sub-picture B (subpicB) 603. Sub-pictures, and hence subpicA 601 and subpicB 603, are rectangular and/or square regions of one or more slices within a sequence of pictures. SubpicA 601 and subpicB 603 may be contained in sub-picture video streams such as any of sub-picture video streams 501-503 in FIG. 5. Only two sub-pictures are shown for clarity of discussion, but any number of sub-pictures can be employed.

A picture is an array of luma samples and/or an array of chroma samples that create a frame or a field thereof. The pictures are encoded and/or decoded in decoding order 650. A decoding order is an order in which syntax elements are processed by a decoding process. As the decoding order proceeds, the decoding process proceeds through the pictures. For clarity of discussion, a picture currently being encoded/decoded at a particular instant is referred to as a current picture 620. A picture that has already been encoded/decoded is a preceding picture 610. A picture that has not yet been decoded is a subsequent picture 630 and/or 640. As shown in FIG. 6, the pictures are consistently partitioned into subpicA 601 and subpicB 603. Hence, each of the preceding picture 610, the current picture 620, and the subsequent pictures 630 and 640 are partitioned into and/or include a subpicA 601 and a subpicB 603.

As described above, IRAP sub-pictures may be applied at different frequencies in some examples. In the example shown, the current picture 620 includes a plurality of VCL NAL units that do not have the same NAL unit type. Specifically, the subpicA 601 in the current picture 620 includes IRAP NAL units 621, while the subpicB 603 in the current picture 620 includes non-IRAP NAL units 623. An IRAP NAL unit 621 is a data structure containing data from an IRAP picture or sub-picture. An IRAP picture/sub-picture is a picture/sub-picture that is coded according to intra-prediction, which indicates a decoder can begin decoding a video sequence at the corresponding picture/sub-picture without referencing pictures preceding the IRAP picture/sub-picture. An IRAP NAL unit 621 may include a CRA NAL unit and/or an IDR NAL unit. A CRA picture/sub-picture is an IRAP picture/sub-picture that does not refresh a DPB, and an IDR picture/sub-picture is an IRAP picture/sub-picture that refreshes a DPB. The non-IRAP NAL unit 623 is any VCL NAL unit that does not include an IRAP picture/sub-picture. For example, the non-IRAP NAL unit 623 may include leading pictures, such as random access skipped leading (RASL) pictures or random access decodable leading (RADL) pictures, or trailing pictures. A leading picture precedes an IRAP picture in presentation order and occurs after the IRAP picture in decoding order 650. A trailing picture occurs after the IRAP picture in both presentation order and decoding order 650. The non-IRAP NAL unit 623 may be coded according to inter-prediction. As such, the current picture 620 is coded according to both inter-picture prediction in subpicB 603 and intra-prediction at subpicA 601.

The preceding picture 610 includes non-IRAP NAL unit 611 and non-IRAP NAL unit 613, the subsequent picture 630 includes non-IRAP NAL unit 631 and non-IRAP NAL unit 633, and subsequent picture 640 includes non-IRAP NAL unit 641 and non-IRAP NAL unit 643. The non-IRAP NAL units 611, 613, 631, 633, 641, and 643 may be similar to non-IRAP NAL unit 623 (e.g., may be coded according to inter-prediction), but may contain different video data.

Since the current picture 620 includes VCL NAL units that do not have the same NAL unit type, the current picture 620 is a mixed NAL unit picture. The presence of a mixed NAL unit picture can be signaled by a flag in a parameter set in a bitstream. Constraints 600 are applied when a mixed a NAL unit picture, such as current picture 620, is encountered.

During encoding, the encoder can determine that subpicA 601 at the current picture 620 is associated with an IRAP NAL unit type, and hence includes an IRAP NAL unit 621. This indicates that the subpicA 601 at the current picture 620 should act as a boundary and prevents inter-prediction at subpicA 601 from referencing across the current picture 620. Hence, the non-IRAP NAL unit 631 cannot reference the non-IRAP NAL unit 611 or any other NAL unit preceding the IRAP NAL unit 621. The encoder can encode the current picture 620 by ensuring that all slices of the current picture positioned in subpicA 601 are associated with the same NAL unit type. For example, when the subpicA 601 contains at least one CRA slice (or IDR slice), all slices in the subpicA 601 must also be CRA (or IDR). The slices of the current picture 620 (including the IRAP NAL unit 621 and non-IRAP NAL unit 623) are then encoded based on NAL unit type (e.g., intra-prediction and inter-prediction, respectively). The subsequent pictures 630 and 640 that follow the current picture 620 in decoding order 650 are also encoded. In order to ensure the IRAP NAL unit 621 prevents inter-prediction propagation, the non-IRAP NAL units 631 and 641 are prevented from referencing 632 the preceding picture 610. The referencing 632 is controlled by a reference picture list, where active entries of the reference picture list indicate the reference pictures that are available for a picture that is currently being coded. As such, constraints 600 ensure that active entries associated with the slices positioned in subpicA 601 at the subsequent pictures 630 and 640 (e.g., non-IRAP NAL units 631 and 641) do not refer to/reference 632 any reference picture preceding the current picture 620 in decoding order 650 when the subpicA 601 at the current picture 620 is associated with an IRAP NAL unit 621 with an IRAP NAL unit type. The non-IRAP NAL unit 631 is still allowed to reference the current picture 620 and/or subsequent picture 640. Further, the non-IRAP NAL unit 641 is still allowed to reference the current picture 620 and/or subsequent picture 630. This stops inter-prediction propagation for the non-IRAP NAL units 631 and 641 because the non-IRAP NAL units 631 and 641 follow the IRAP NAL unit 621 in subpicA 601. The subsequent picture 630 and/or 640 can then be encoded based on NAL unit type and pursuant to the constraints 600.

Such constraints 600 do not apply to the non-IRAP NAL units 633 and 643 because they are located in subpicB 603, and hence do not follow an IRAP NAL unit in subpicB 603. Accordingly, non-IRAP NAL units 633 and 643 may reference 634 the preceding picture 610. Accordingly, active entries of reference picture lists associated with non-IRAP NAL units 633 and 643 may reference the preceding picture 610, the current picture 620, and/or the subsequent pictures 640 or 630, respectively. In this manner, inter-prediction is broken for subpicA 601 by the IRAP NAL unit 621, however the IRAP NAL unit 621 does not stop inter-prediction propagation for subpicB 603. Hence, by employing constraints 600, inter-prediction chains can be stopped (or not) on a sub-picture by sub-picture basis. As noted above, only two sub-pictures are shown. However, constraints 600 can be applied to any number of sub-pictures in order to stop the propagation of inter-prediction reference chains on a sub-picture by sub-picture basis.

Figure 7:
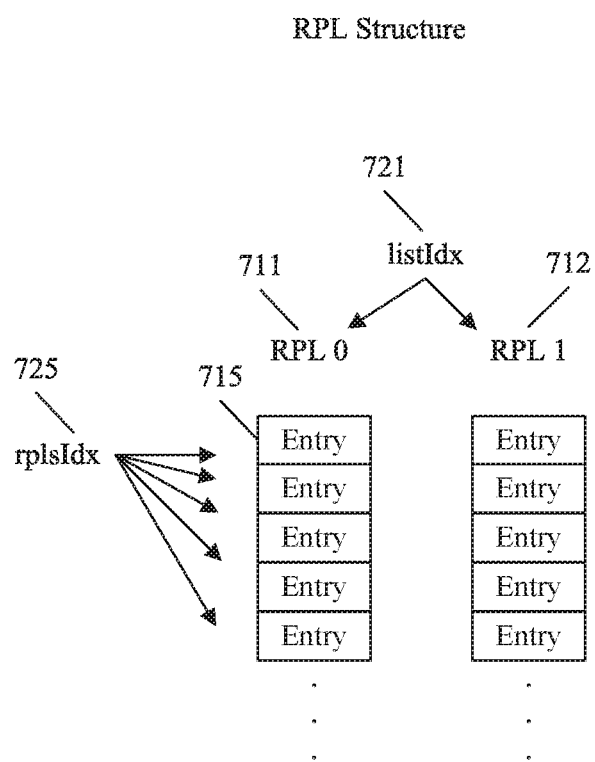
FIG. 7 is a schematic diagram illustrating an example reference picture list structure containing reference picture lists.

FIG. 7 is a schematic diagram illustrating an example reference picture list (RPL) structure 700 containing reference picture lists. A RPL structure 700 can be employed to store indications of reference pictures used in unidirectional inter-prediction and/or bidirectional inter-prediction. Hence, the RPL structure 700 can be employed by a codec system 200, an encoder 300, and/or a decoder 400 when performing method 100. Further, the RPL structure 700 may be employed when coding a VR picture video stream 500, in which case the RPL structure 700 may be coded according to constraints 600.

RPL structure 700 is an addressable syntax structure that contains multiple reference picture lists, such as RPL0 711 and RPL1 712. The RPL structure 700 may be coded and/or derived for use when coding a corresponding slice. The RPL structure 700 may be stored in a SPS and/or a slice header of a bitstream, depending on the example. A reference picture list, such as RPL0 711 and RPL1 712, is a list indicating reference pictures used for inter-prediction. RPL0 711 and RPL1 712 may each include a plurality of entries 715. A RPL structure entry 715 is an addressable location in a RPL structure 700 that indicates a reference picture associated with a reference picture list, such as RPL0 711 and/or RPL1 712. Each entry 715 may contain a picture order count (POC) value (or other pointer value) that references a picture used for inter-prediction. Specifically, references to pictures used by unidirectional inter-prediction are stored in RPL0 711 and references to pictures used by bidirectional inter-prediction are stored in both RPL0 711 and RPL1 712. For example, bidirectional inter-prediction may use one reference picture indicated by RPL0 711 and one reference picture indicated by RPL1 712.

In a specific example, the RPL structure 700 can be denoted as ref_pic_list_struct(listIdx, rplsIdx) where list index (listIdx) 721 identifies a reference picture list RPL0 711 and/or RPL1 712 and reference picture lists structure index (rplsIdx) 725 identifies an entry 715 in the reference picture list. Accordingly, ref_pic_list_struct is a syntax structure that returns the entry 715 based on listIdx 721 and rplsIdx 725. An encoder can encode a portion of the RPL structure 700 for each non-intra-coded slice in a video sequence. A decoder can then resolve the corresponding portion of the RPL structure 700 before decoding each non-intra-coded slice in a coded video sequence. The entries 715 that indicate reference pictures that are available for use when coding a current picture according to inter-prediction are referred to as active entries. Entries 715 that cannot be used for a current picture are referred to as inactive entries.

Figure 8:
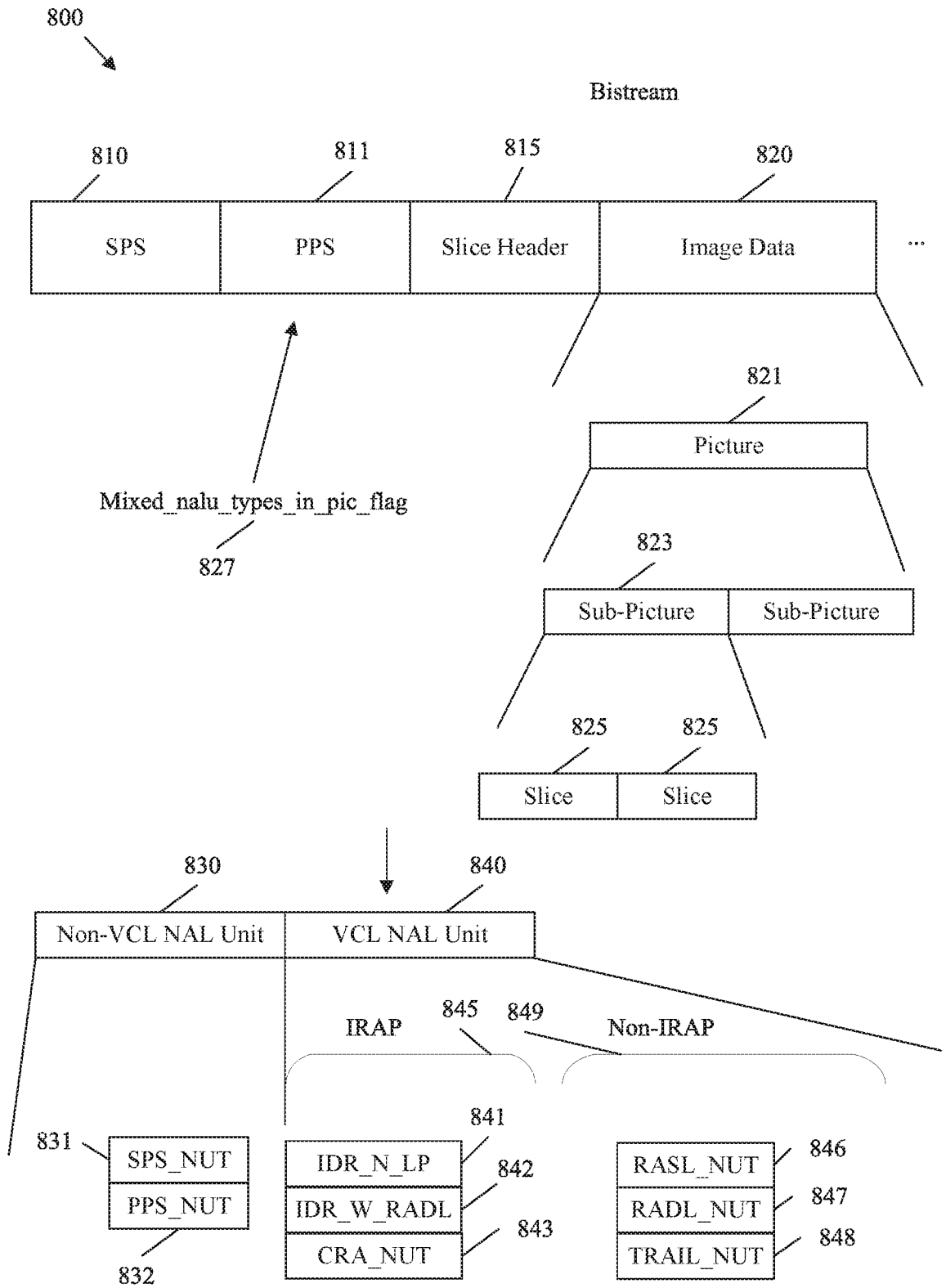
FIG. 8 is a schematic diagram illustrating an example bitstream containing pictures with mixed NAL unit types.

FIG. 8 is a schematic diagram illustrating an example bitstream 800 containing pictures with mixed NAL unit types. For example, the bitstream 800 can be generated by a codec system 200 and/or an encoder 300 for decoding by a codec system 200 and/or a decoder 400 according to method 100. Further, the bitstream 800 may include VR picture video stream 500 merged from multiple sub-picture video streams 501-503 at a plurality of video resolutions. Further, the bitstream 800 may include a RPL structure 700 coded according to constraints 600.

The bitstream 800 includes a sequence parameter set (SPS) 810, a plurality of picture parameter sets (PPSs) 811, a plurality of slice headers 815, and image data 820. An SPS 810 contains sequence data common to all the pictures in the video sequence contained in the bitstream 800. Such data can include picture sizing, bit depth, coding tool parameters, bit rate restrictions, etc. The PPS 811 contains parameters that apply to an entire picture. Hence, each picture in the video sequence may refer to a PPS 811. It should be noted that, while each picture refers to a PPS 811, a single PPS 811 can contain data for multiple pictures in some examples. For example, multiple similar pictures may be coded according to similar parameters. In such a case, a single PPS 811 may contain data for such similar pictures. The PPS 811 can indicate coding tools available for slices in corresponding pictures, quantization parameters, offsets, etc. The slice header 815 contains parameters that are specific to each slice in a picture. Hence, there may be one slice header 815 per slice in the video sequence. The slice header 815 may contain slice type information, picture order counts (POCs), reference picture lists, prediction weights, tile entry points, deblocking parameters, etc. It should be noted that a slice header 815 may also be referred to as a tile group header in some contexts.

The image data 820 contains video data encoded according to inter-prediction and/or intra-prediction as well as corresponding transformed and quantized residual data. For example, a video sequence includes a plurality of pictures 821 coded as image data 820. A picture 821 is a single frame of a video sequence and hence is generally displayed as a single unit when displaying the video sequence. However, sub-pictures 823 may be displayed to implement certain technologies such as virtual reality. The pictures 821 each reference a PPS 811. The pictures 821 may be divided into sub-pictures 823, tiles, and/or slices. A sub-picture 823 is a spatial region of a picture 821 that is applied consistently over a coded video sequence. Accordingly, a sub-picture 823 may be displayed by a HMD in a VR context. Further, a sub-picture 823 with a specified POC may be obtained from a sub-picture video stream 501-503 at a corresponding resolution. A sub-picture 823 may reference the SPS 810. In some systems, the slices 825 are referred to as tile groups containing tiles. The slices 825 and/or tile groups of tiles reference a slice header 815. A slice 825 may be defined as an integer number of complete tiles or an integer number of consecutive complete coding tree unit (CTU) rows within a tile of a picture 821 that are exclusively contained in a single NAL unit. Hence, the slices 825 are further divided into CTUs and/or coding tree blocks (CTBs). The CTUs/CTBs are further divided into coding blocks based on coding trees. The coding blocks can then be encoded/decoded according to prediction mechanisms.

The parameter sets and/or slices 825 are coded in NAL units. A NAL unit may be defined as a syntax structure containing an indication of the type of data to follow and bytes containing that data in the form of an RBSP interspersed as necessary with emulation prevention bytes. More specifically, a NAL unit is a storage unit that contains a parameter set or a slice 825 of a picture 821 and a corresponding slice header 815. Specifically, VCL NAL units 840 are NAL units that contain a slice 825 of a picture 821 and a corresponding slice header 815. Further, non-VCL NAL units 830 contain parameter sets, such as the SPS 810 and the PPS 811. Several types of NAL units may be employed. For example, the SPS 810 and the PPS 811 may be included in a SPS NAL unit type (SPS_NUT) 831 and a PPS NAL unit type (PPS_NUT) 832, respectively, which are both non-VCL NAL units 830. As such, a decoder can read a SPS_NUT 831 from a bitstream 800 to obtain the SPS 810 as coded by an encoder. Likewise, a decoder can read a PPS_NUT 832 from a bitstream 800 to obtain the PPS 811 as coded by an encoder.

Slices 825 of TRAP pictures/sub-pictures can be contained in TRAP NAL units 845. Slices 825 of non-IRAP pictures/sub-pictures, such as leading pictures and trailing pictures, can be included in non-IRAP NAL units 849. For example, a slice 825 can be included in a single VCL NAL unit 840. The VCL NAL unit 840 can then be assigned a type identifier based on the type of picture 821 and/or sub-picture 823 that includes the slice 825. For example, a slice 825 taken from a sub-picture 823 that is a CRA sub-picture is included in a CRA_NUT 843. Bitstream 800 includes several types of TRAP NAL units 845, and hence picture/sub-picture types, including IDR with no leading pictures, IDR with random access decodable leading (RADL) pictures, and CRA pictures. Bitstream 800 also includes several types of non-IRAP NAL units 849, and hence picture/sub-picture types, including random access skipped leading (RASL) pictures, RADL pictures, and trailing pictures.

A leading picture is a picture that is coded after an TRAP picture in decoding order and prior to the picture in presentation order. An TRAP NAL unit 845 is any NAL unit that contains a slice 825 taken from an TRAP picture or sub-picture. A non-IRAP NAL unit 849 is any NAL unit that contains a slice 825 taken from any picture that is not an TRAP picture or sub-picture (e.g., leading pictures or trailing pictures). IRAP NAL units 845 and non-IRAP NAL units 849 are both VCL NAL units 840 as they both contain slice data. In an example embodiment, an TRAP NAL unit 845 may include slices 825 from an IDR picture without leading pictures or an IDR associated with RADL pictures in an IDR_N_LP NAL unit 841 or an IDR_w_RADL NAL unit 842, respectively. Further, an IRAP NAL unit 845 may include slices 825 from a CRA picture in a CRA_NUT 843. In an example embodiment, a non-IRAP NAL unit 849 may include slices 825 from a RASL picture, a RADL picture, or a trailing picture, in a RASL_NUT 846, a RADL_NUT 847, or a TRAIL_NUT 848, respectively. In an example embodiment, a complete list of possible NAL units is shown below as sorted by NAL unit type.

| nal_unit_type | Name of nal_unit_type | Content of NAL unit and RBSP syntax structure | NAL unit type class |
| --- | --- | --- | --- |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |

| nal_unit_type | Name of nal_unit_type | Content of NAL unit and RBSP syntax structure | NAL unit type class |
|---|---|---|---|
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

As noted above, a VR video stream may include sub-pictures 823 with IRAP pictures at different frequencies. This allows fewer IRAP pictures to be employed for spatial regions that a user is unlikely to look at and more IRAP pictures to be employed for spatial regions that a user is likely to view often. In this way, the spatial regions that the user is likely to switch back to regularly can be quickly adjusted to a higher resolution. When this approach results in a picture 821 that includes both TRAP NAL units 845 and non-IRAP NAL units 849, the picture 821 is referred to as a mixed picture. This condition can be signaled by a mixed NAL unit types in picture flag (mixed_nalu_types_in_pic_flag) 827. The mixed_nalu_types_in_pic_flag 827 may be set in the PPS 811. Further, the mixed_nalu_types_in_pic_flag 827 may be set equal to one when specifying that each picture 821 referring to the PPS 811 has more than one VCL NAL unit 840 and the VCL NAL units 840 do not have the same value of NAL unit type (nal_unit_type). Further, the mixed_nalu_types_in_pic_flag 827 may be set equal to zero when each picture 821 referring to the PPS 811 has one or more VCL NAL units 840 and the VCL NAL units 840 of each picture 821 referring to the PPS 811 all have the same value of nal_unit_type.

Further, various constraints may be employed such that VCL NAL units 840 of one or more of the sub-pictures 823 of the picture 821 all have a first particular value of NAL unit type and other VCL NAL units 840 in the picture 821 all have a different second particular value of NAL unit type when the mixed_nalu_types_in_pic_flag 827 is set. For example, the constraint may require that a mixed picture 821 contain a single type of IRAP NAL unit 845 and a single type of non-IRAP NAL unit 849. For example, the picture 821 can include one or more IDR_N_LP NAL units 841, one or more IDR_w_RADL NAL units 842, or one or more CRA_NUTs 843, but not any combination of such IRAP NAL units 845. Further, the picture 821 can include one or more RASL_NUTs 846, one or more RADL_NUTs 847, or one or more TRAIL_NUTs 848, but not any combination of such IRAP NAL units 845. In addition, a sub-picture 823 may be constrained to only one type of VCL NAL unit 840. Further, constraints 600 may be applied to sub-pictures 823 based on the type of VCL NAL units 840 that are employed in the bitstream 800.

The preceding information is now described in more detail herein below. In a video codec specification, picture types may be identified for defining decoding processes. This may include for derivation of picture identification (e.g., POC), for marking of reference pictures status in the (DPB), for output of pictures from the DPB, etc.

In AVC and HEVC, picture types can be identified from a NAL unit type that contains the coded picture. Picture types in AVC include IDR pictures and non-IDR pictures. Picture types in HEVC include trailing picture, temporal sub-layer access picture (TSA), step-wise temporal sub-layer access picture (STSA), random access decodable leading picture (RADL), random access skipped leading picture (RASL), broken-link access picture (BLA), IDR, and CRA.

Each of these picture types in HEVC can be further differentiated as sub-layer referenced pictures or sub-layer non-referenced pictures. BLA pictures can also include a BLA with leading picture, a BLA with RADL picture, and a BLA without leading picture. IDR pictures can include an IDR with RADL picture and an IDR without leading picture.

In HEVC, IDR, BLA, and CRA pictures are IRAP pictures. VVC employs IDR and CRA pictures as IRAP pictures. An IRAP picture provides the following functionalities/benefits. The presence of an TRAP picture indicates that a decoding process can start from that picture. This functionality supports a random access feature that allows a decoding process to start at a position in a bitstream as long as an IRAP picture is present at that position. The position may not be at the beginning of a bitstream. The presence of an TRAP picture may also refresh the decoding process such that coded pictures after TRAP picture, excluding RASL pictures, are coded without any reference to pictures preceding the TRAP picture. Hence, an IRAP picture prevents errors occurring prior to the IRAP picture from propagating to pictures that follow the TRAP picture in decoding order.

IRAP pictures provide the above-mentioned functionalities, but result in a penalty to compression efficiency. The presence of an IRAP picture also causes a surge in bit-rate. This penalty to the compression efficiency has two causes. First, as an TRAP picture is an intra-predicted picture, and hence the IRAP picture is represented by more bits than inter-predicted pictures. Second, the presence of an IRAP picture may break temporal prediction by refreshing the decoding process when reference pictures are removed from the DPB. This may result in less efficient coding of pictures that follow the IRAP picture as fewer reference pictures are available for inter-prediction.

IDR pictures in HEVC may be derived and signaled differently from other picture types. Some of the differences are as follows. When signaling and deriving a POC value of an IDR picture, the most significant bit (MSB) of the POC may be set equal to zero instead of being derived from a previous key picture. Further, a slice header of an IDR picture may not contain information to assist in reference picture management. For other picture types, such as CRA and trailing, reference picture sets (RPS) or reference picture lists may be employed for a reference pictures marking process. This process is employed to determine the status of reference pictures in the DPB as either used for reference or unused for reference. For IDR pictures such information may not be signaled because the presence of IDR indicates that the decoding process should mark all reference pictures in the DPB as unused for reference.

In addition to picture types, picture identification is also employed for multiple purposes. This includes picture identification of reference pictures in inter-prediction, identification of pictures for output from the DPB, identification of pictures for scaling of motion vectors, identification of pictures for weighted prediction, etc. In AVC and HEVC, pictures can be identified by POC. In AVC and HEVC, pictures in the DPB can be marked as used for short-term reference, used for long-term reference, or unused for reference. Once a picture has been marked unused for reference, the picture can no longer be used for prediction. The picture can be removed from the DPB when the picture is no longer needed for output. AVC employs short-term and long-term reference pictures. A reference picture may be marked as unused for reference when the picture is no longer needed for prediction reference. The conversion between short-term, long-term, and unused for reference is controlled by the decoded reference picture marking process. An implicit sliding window process and an explicit memory management control operation (MMCO) process can be employed as decoded reference picture marking mechanisms. The sliding window process marks a short-term reference picture as unused for reference when the number of reference frames is equal to a specified maximum number in the SPS. The short-term reference pictures are stored in a first-in, first-out manner so that the most recently decoded short-term pictures are kept in the DPB. The explicit MMCO process may include multiple MMCO commands. An MMCO command may mark one or more short-term or long-term reference pictures as unused for reference or mark all the pictures as unused for reference. An MMCO command may also mark the current reference picture or an existing short-term reference picture as long-term and assign a long-term picture index to that long-term reference picture. In AVC the reference picture marking operations as well as the processes for output and removal of pictures from the DPB are performed after a picture has been decoded.

HEVC employs a RPS for reference picture management. An RPS may include, for each slice, a complete set of the reference pictures that are used by the current picture or any subsequent picture. Thus, the RPS signals a complete set of all pictures that should be kept in the DPB for use by the current or subsequent pictures. This is different from the AVC scheme where only relative changes to the DPB are signaled. The RPS may not maintain information from earlier pictures in decoding in order to maintain the correct status of reference pictures in the DPB. The order of picture decoding and DPB operations in HEVC exploit the advantages of the RPS and improve error resilience. In AVC the picture marking and buffer operations may be applied after a current picture has been decoded. In HEVC, the RPS is first decoded from a slice header of the current picture. Picture marking and buffer operations are then applied before decoding the current picture.

VVC may directly signal and derive a reference picture list zero and a reference picture list one. The reference picture lists are not based on an RPS, the sliding window, or the MMCO process as in HEVC and AVC. Reference picture marking is performed directly based on reference picture lists zero and one by utilizing both active and inactive entries in the reference picture lists. Only active entries may be used as reference indices in inter-prediction of CTUs for a current picture. Information for derivation of the two reference picture lists is signaled by syntax elements and syntax structures in the SPS, the PPS, and the slice header. Predefined RPL structures are signaled in the SPS for use by reference in the slice header. The two reference picture lists are generated for all types of slices including bidirectional inter-prediction (B), unidirectional inter-prediction (P), and intra-prediction (I) slices. The two reference picture lists are constructed without using a reference picture list initialization process or a reference picture list modification process. Long-term reference pictures (LTRPs) are identified by POC LSBs. Delta POC MSB cycles may be signaled for LTRPs as desired on a picture by picture basis.

HEVC may employ regular slices, dependent slices, tiles, and Wavefront Parallel Processing (WPP) as partitioning schemes. These partitioning schemes may be applied for Maximum Transfer Unit (MTU) size matching, parallel processing, and reduced end-to-end delay. Each regular slice may be encapsulated in a separate NAL unit. Entropy coding dependency and in-picture prediction, including intra-sample prediction, motion information prediction, and coding mode prediction, may be disabled across slice boundaries. Thus, a regular slice can be reconstructed independently from other regular slices within the same picture. However, slices may still have some interdependencies due to loop filtering operations.

Regular slice based parallelization may not require significant inter-processor or inter-core communication. One exception is that inter-processor and/or inter-core data sharing may be significant for motion compensation when decoding a predictively coded picture. Such a process may involve more processing resources than inter-processor or inter-core data sharing due to in-picture prediction. However, for the same reason, the use of regular slices can incur substantial coding overhead due to the bit cost of the slice header and due to the lack of prediction across the slice boundaries. Further, regular slices also serve as a mechanism for bitstream partitioning to match MTU size requirements due to the in-picture independence of regular slices and due to the fact that each regular slice is encapsulated in a separate NAL unit. In many cases, the goal of parallelization and the goal of MTU size matching place contradicting demands to the slice layout in a picture.

Dependent slices have short slice headers and allow partitioning of the bitstream at treeblock boundaries without breaking any in-picture prediction. Dependent slices provide fragmentation of regular slices into multiple NAL units. This provides reduced end-to-end delay by allowing a part of a regular slice to be transmitted before the encoding of the entire regular slice is finished.

In WPP, the picture is partitioned into single rows of CTBs. Entropy decoding and prediction may use data from CTBs in other partitions. Parallel processing is possible through parallel decoding of CTB rows. The start of the decoding of a CTB row may be delayed by one or two CTBs, depending on the example, to ensure that data related to a CTB above and to the right of the subject CTB is available before the subject CTB is decoded. This staggered start creates the appearance of a wavefront. This process supports parallelization with up to as many processors/cores as the picture contains CTB rows. Because in-picture prediction between neighboring treeblock rows within a picture is permitted, the inter-processor/inter-core communication to enable in-picture prediction can be substantial. The WPP partitioning does not result in the production of additional NAL units. Thus WPP may not be used for MTU size matching. However, if MTU size matching is required, regular slices can be used with WPP with certain coding overhead.

Tiles define horizontal and vertical boundaries that partition a picture into tile columns and rows. The scan order of CTBs may be local within a tile in the order of a CTB raster scan of a tile. Accordingly, a tile may be completely decoded before decoding the top-left CTB of the next tile in the order of tile raster scan of a picture. Similar to regular slices, tiles break in-picture prediction dependencies as well as entropy decoding dependencies. However, tiles may not be included into individual NAL units. Hence tiles may not be used for MTU size matching. Each tile can be processed by one processor/core. The inter-processor/inter-core communication employed for in-picture prediction between processing units decoding neighboring tiles may be limited to conveying a shared slice header when a slice includes more than one tile and loop filtering related sharing of reconstructed samples and metadata. When more than one tile or WPP segment is included in a slice, the entry point byte offset for each tile or WPP segment other than the first one in the slice may be signaled in the slice header.

For simplicity, HEVC employs certain restrictions on the application of the four different picture partitioning schemes. A coded video sequence may not include both tiles and wavefronts for most of the profiles specified in HEVC. Further, either or both of the following conditions must be fulfilled for each slice and/or tile. All coded treeblocks in a slice are included in the same tile. Further, all coded treeblocks in a tile are included in the same slice. In addition, a wavefront segment contains exactly one CTB row. When WPP is in use, a slice starting within a CTB row should end in the same CTB row.

HEVC may include a temporal motion constrained tile set (MCTS) supplemental enhancement information (SEI) message, a MCTS extraction information set SEI message, and a MCTS extraction information nesting SEI message. The temporal MCTS SEI message indicates the existence of MCTS in the bitstream and signals the MCTS. For each MCTS, motion vectors are restricted to point to full-sample locations inside the MCTS and to fractional-sample locations that employ only full-sample locations inside the MCTS for interpolation. The usage of motion vector candidates for temporal motion vector prediction derived from blocks outside the MCTS is disallowed. This way, each MCTS may be independently decoded without the existence of tiles not included in the MCTS. The MCTS extraction information sets SEI message provides supplemental information that can be used in the MCTS sub-bitstream extraction to generate a conforming bitstream for an MCTS set. The information includes a number of extraction information sets each defining a number of MCTS sets and containing RBSP bytes of the replacement video parameter sets (VPSs), SPSs, and PPSs to be used during the MCTS sub-bitstream extraction process. When extracting a sub-bitstream according to the MCTS sub-bitstream extraction process, parameter sets such as VPSs, SPSs, and PPSs may be rewritten or replaced. Slice headers may also be updated because one or more of the slice address related syntax elements may include different values after sub-bitstream extraction.

VVC may partition pictures as described below. Pictures may be divided into tile groups and tiles. A tile may be a sequence of CTUs that cover a rectangular region of a picture. A tile group, also known as a slice, may contain a number of tiles of a picture. Slices/tile groups may be configured according to raster-scan mode and rectangular mode. In the raster-scan mode, a tile group/slice contains a sequence of tiles in a raster scan order relative to the picture boundaries. In the rectangular mode, a tile group/slice contains a number of tiles that collectively form a rectangular region of the picture. The tiles within a rectangular tile group are included in raster scan order relative to the tile group/slice.

Three hundred sixty degree video applications (e.g., VR) may display only part of a sphere of content and consequently may only display a sub-set of an entire picture. Viewport dependent three hundred sixty degree delivery can be employed to reduce bitrate in delivery of VR video over DASH. Viewpoint dependent coding may divide the whole sphere/projected picture (e.g., using cubemap projection) into multiple MCTSs. Two or more bitstreams may then be encoded with different spatial resolutions or qualities. The MCTS(s) from the higher resolution/quality bitstream is sent to the decoder for the viewport to be displayed (e.g., the front viewport). The rest of the viewports use MCTSs from lower resolution/quality bitstreams. These MCTSs are packed in a certain way and then sent to the receiver to be decoded. The viewport generally seen by the user is represented by high resolution/quality MCTS, which provides a positive viewing experience. When the user turns to see another viewport (e.g., the left or right viewport) the displayed content comes from the lower resolution/quality viewport. This continues for a short period until the system can fetch the high resolution/quality MCTSs for that viewport.

A delay occurs between the time when the user turns and the time when a higher resolution/quality representation of the viewport is displayed. This delay is based on how fast the system can fetch the higher resolution/quality MCTSs for that viewport. This depends on the IRAP period, which is the interval between the occurrences of two IRAPs. This is because the MCTSs of the new viewport can only be decodable starting from an IRAP picture. If the IRAP period is coded every one second then the following applies. The best case scenario for the delay is the same as the network round-trip delay when the user turns to see the new viewport just before the system starts fetching the new segment/IRAP period. In this scenario, the system may request the higher resolution/quality MCTSs for the new viewport right away. Thus, the only delay is the network round-trip delay, which includes the delay of the fetching request plus the transmission time of the requested MCTS. This assumes that the minimum buffering delay can be set to zero or other negligible value. The network round-trip delay can be around two hundred milliseconds, for example. The worst case scenario for the delay is the IRAP period plus the network round-trip delay when the user turns to see the new viewport just after the system already made a request for the next segment. To improve the worst case scenario above, one can encode the bitstreams with more frequent IRAP pictures so that the IRAP period is shorter. This reduces the overall delay. However, more IRAP pictures increases the bandwidth and hence lowers the compression efficiency.

Mixed NAL unit types may be used within a picture by adding a PPS flag that specifies whether all VCL NAL units of a picture have the same NAL unit type. A constraint may also be added to require that, for any particular picture, either all VCL NAL units are the same NAL unit type, or some VCL NAL units have a particular IRAP NAL unit type and the rest have a particular non-IRAP VCL NAL unit type. An example description of the mechanism is as follows.

An IRAP picture is a coded picture for which mixed_nalu_types_in_pic_flag is equal to zero and each VCL NAL unit has NalUnitType in the range of IDR_W_RADL to CRA_NUT, inclusive.

An example PPS RBSP syntax is as follows.

|  | Descriptor |
| --- | --- |
| pic_parameter_set_rbsp( ) { |  |
|   pps_pic_parameter_set_id | ue(v) |
|   pps_seq_parameter_set_id | ue(v) |
|   mixed_nalu_types_in_pic_flag | u(1) |
|   ... |  |

An example NAL unit header semantics is as follows. An IDR picture having NalUnitType equal to IDR_N_LP does not have associated leading pictures present in the bitstream. An IDR picture having NalUnitType equal to IDR_W_RADL does not have associated RASL pictures present in the bitstream, but may have associated RADL pictures in the bitstream. For VCL NAL units of any particular picture, the following applies. If mixed_nalu_types_in_pic_flag is equal to zero, all the VCL NAL units should have the same value of nal_unit_type. Otherwise, some of the VCL NAL units should have a particular TRAP NAL unit type value (e.g., a value of nal_unit_type in the range of IDR_W_RADL to CRA_NUT, inclusive), while all the other VCL NAL units should have a particular non-IRAP VCL NAL unit type (e.g., a value of nal_unit_type in the range of TRAIL_NUT to RSV_VCL_15, inclusive, or equal to GRA_NUT).

An example PPS RBSP semantics is as follows. A pps_seq_parameter_set_id specifies the value of a sps_seq_parameter_set_id for the active SPS. The value of pps_seq_parameter_set_id should be in the range of zero to fifteen, inclusive. A mixed_nalu_types_in_pic_flag may be set equal to one to specify that each picture referring to the PPS has multiple VCL NAL units and these NAL units don't have the same value of nal_unit_type. A mixed_nalu_types_in_pic_flag may be set equal to zero to specify that the VCL NAL units of each picture referring to the PPS have the same value of nal_unit_type. When sps_idr_rpl_present_flag is equal to zero, the value of mixed_nalu_types_in_pic_flag should be equal to zero.

Pictures may be divided into sub-pictures. The indication of the existence of sub-pictures may be indicated in the SPS along with other sequence-level information of sub-pictures. Whether the boundaries of a sub-picture are treated as picture boundaries in the decoding process (excluding in-loop filtering operations) can be controlled by the bitstream. Whether in-loop filtering across sub-picture boundaries is disabled can be controlled by the bitstream for each sub-picture. The deblocking filter (DBF), SAO, and adaptive loop filter (ALF) processes are updated for controlling of in-loop filtering operations across sub-picture boundaries. The sub-picture width, height, horizontal offset, and vertical offset may be signaled in units of luma samples in the SPS. Sub-picture boundaries may be constrained to be slice boundaries. Treating a sub-picture as a picture in the decoding process (excluding in-loop filtering operations) is specified by updating: the coding_tree_unit( ) syntax, the derivation process for advanced temporal luma motion vector prediction, the luma sample bilinear interpolation process, the luma sample eight tap interpolation filtering process, and the chroma sample interpolation process. Sub-picture identifiers (IDs) are explicitly specified in the SPS and included in the tile group headers to enable extraction of sub-picture sequences without the need of changing VCL NAL units. Output sub-picture sets (OSPS) may specify normative extraction and conformance points for sub-pictures and sets thereof.

The preceding systems have certain problems. A bitstream may contain pictures with both IRAP and non-IRAP slices. Errors would occur if slices in pictures that follow such a picture in decoding order and cover the same picture regions of the IRAP slices in the picture were to refer to pictures earlier than the picture in decoding order for inter-prediction.

The present disclosure includes improved techniques for support of sub-picture or MCTS based random access in video coding. More specifically, this disclosure discloses methods that impose some constraints for TRAP slices within a picture having both TRAP and non-IRAP slices.

The description of the techniques VVC. However, the techniques may also apply to other video/media codec specifications.

For example, constraints are added to make sure that slices in pictures that (1) follow a mixed NAL unit picture in decoding order, and that (2) cover the same picture regions of the TRAP slices in the picture do not refer to reference pictures earlier than the mixed NAL unit picture in decoding order for inter-prediction. An example implementation is as follows.

An IRAP picture may be defined as a coded picture for which mixed_nalu_types_in_pic_flag is equal to zero and each VCL NAL unit has NalUnitType in the range of IDR_W_RADL to CRA_NUT, inclusive.

An example PPS RBSP syntax is as follows.

| | Descriptor |
|---|---|
| pic_parameter_set_rbsp( ) { | |
|   pps_pic_parameter_set_id | ue(v) |
|   pps_seq_parameter_set_id | ue(v) |
|   mixed_nalu_types_in_pic_flag | u(1) |
|   ... | |

An example NAL unit header semantics is as follows. An IDR picture having NalUnitType equal to IDR_N_LP does not have associated leading pictures present in the bitstream. An IDR picture having NalUnitType equal to IDR_W_RADL does not have associated RASL pictures present in the bitstream, but may have associated RADL pictures in the bitstream. For VCL NAL units of any particular picture, the following applies. If mixed_nalu_types_in_pic_flag is equal to zero, all the VCL NAL units shall have the same value of nal_unit_type. Otherwise, some of the VCL NAL units shall have a particular TRAP NAL unit type value (e.g., a value of nal_unit_type in the range of IDR_W_RADL to CRA_NUT, inclusive), while all the other VCL NAL units shall have a particular non-IRAP VCL NAL unit type (e.g., a value of nal_unit_type in the range of TRAIL_NUT to RSV_VCL_15, inclusive, or equal to GRA_NUT).

An example PPS RBSP semantics is as follows. A pps_seq_parameter_set_id specifies the value of sps_seq_parameter_set_id for the active SPS. The value of pps_seq_parameter_set_id shall be in the range of zero to fifteen, inclusive. A mixed_nalu_types_in_pic_flag may be set equal to one to specify that each picture referring to the PPS has multiple VCL NAL units and these NAL units don't have the same value of nal_unit_type. A mixed_nalu_types_in_pic_flag may be set equal to zero to specify that the VCL NAL units of each picture referring to the PPS have the same value of nal_unit_type. When sps_idr_rpl_present_flag is equal to zero, the value of mixed_nalu_types_in_pic_flag should be equal to zero. For each TRAP slice in a picture picA that also has at least one non-IRAP slice, the following applies. The TRAP slice shall belong to a sub-picture subpicA and the boundaries of the sub-picture are treated as picture boundaries in the decoding process (excluding in-loop filtering operations). For example, the value of sub_pic_treated_as_pic_flag[i] for subpicA should be equal to one. The TRAP slice shall not belong to a sub-picture in the same picture containing one or more non-IRAP slices. For all the following layer access units (AUs) in decoding order, neither RefPicList[0] nor RefPicList[1] of a slice in subpicA shall include any picture preceding picA in decoding order in an active entry.

Figure 9:
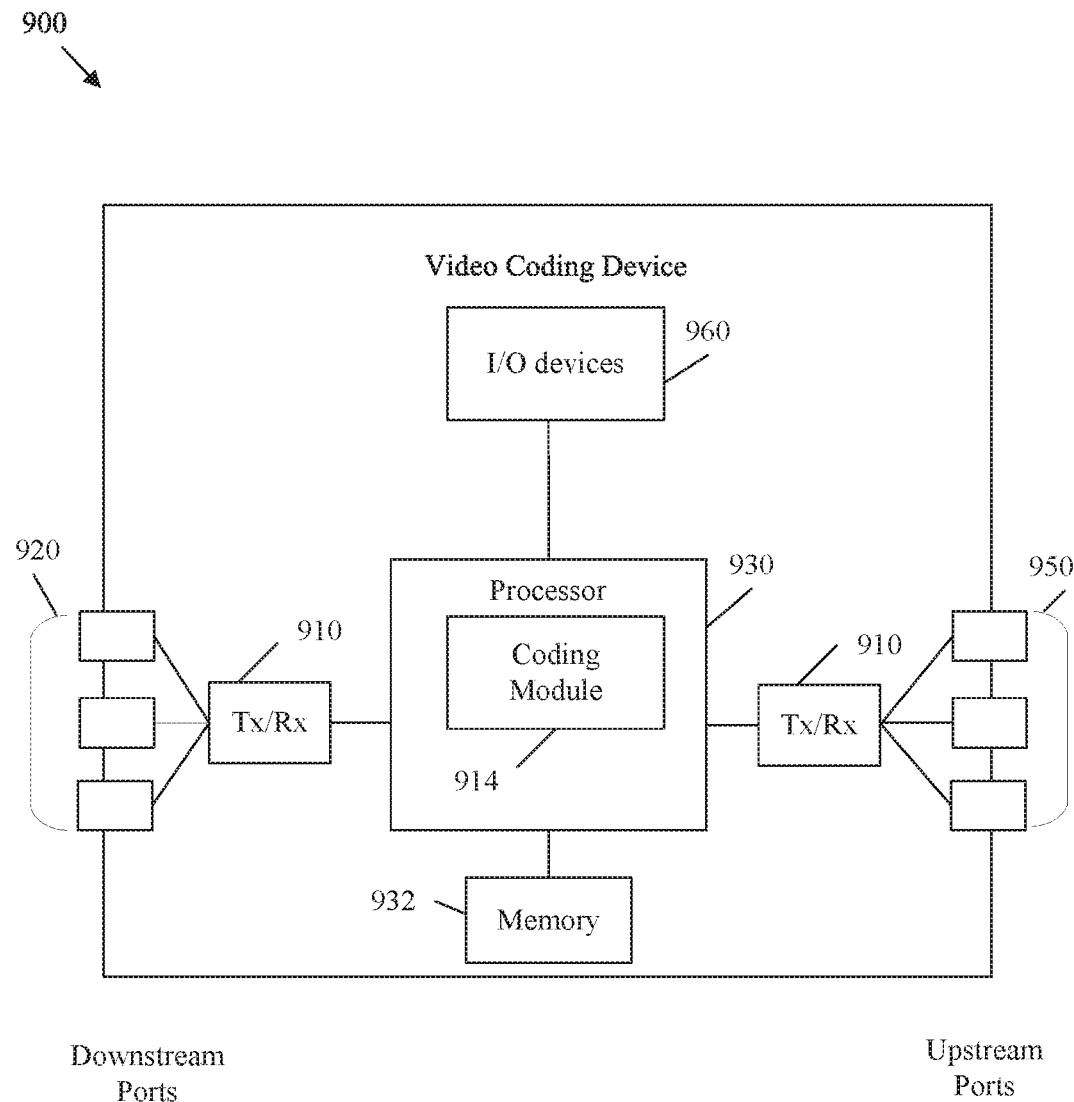
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, which may employ a VR picture video stream 500, a bitstream 800, and/or a RPL structure 700 coded according to constraints 600. The coding module 914 may also implement any other method/mechanism described herein. Further, the coding module 914 may implement a codec system 200, an encoder 300, and/or a decoder 400. For example, the coding module 914 can code a VR video including a current picture with both IRAP NAL units and non-IRAP NAL units. For example, the IRAP NAL units may be contained in a sub-picture. When this occurs, the coding module 914 can constrain slices at a picture following the current picture that are also contained in the sub-picture. Such slices may be prevented from referencing reference pictures preceding the current picture. Hence, coding module 914 causes the video coding device 900 to provide additional functionality and/or coding efficiency when coding video data. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

Figure 10:
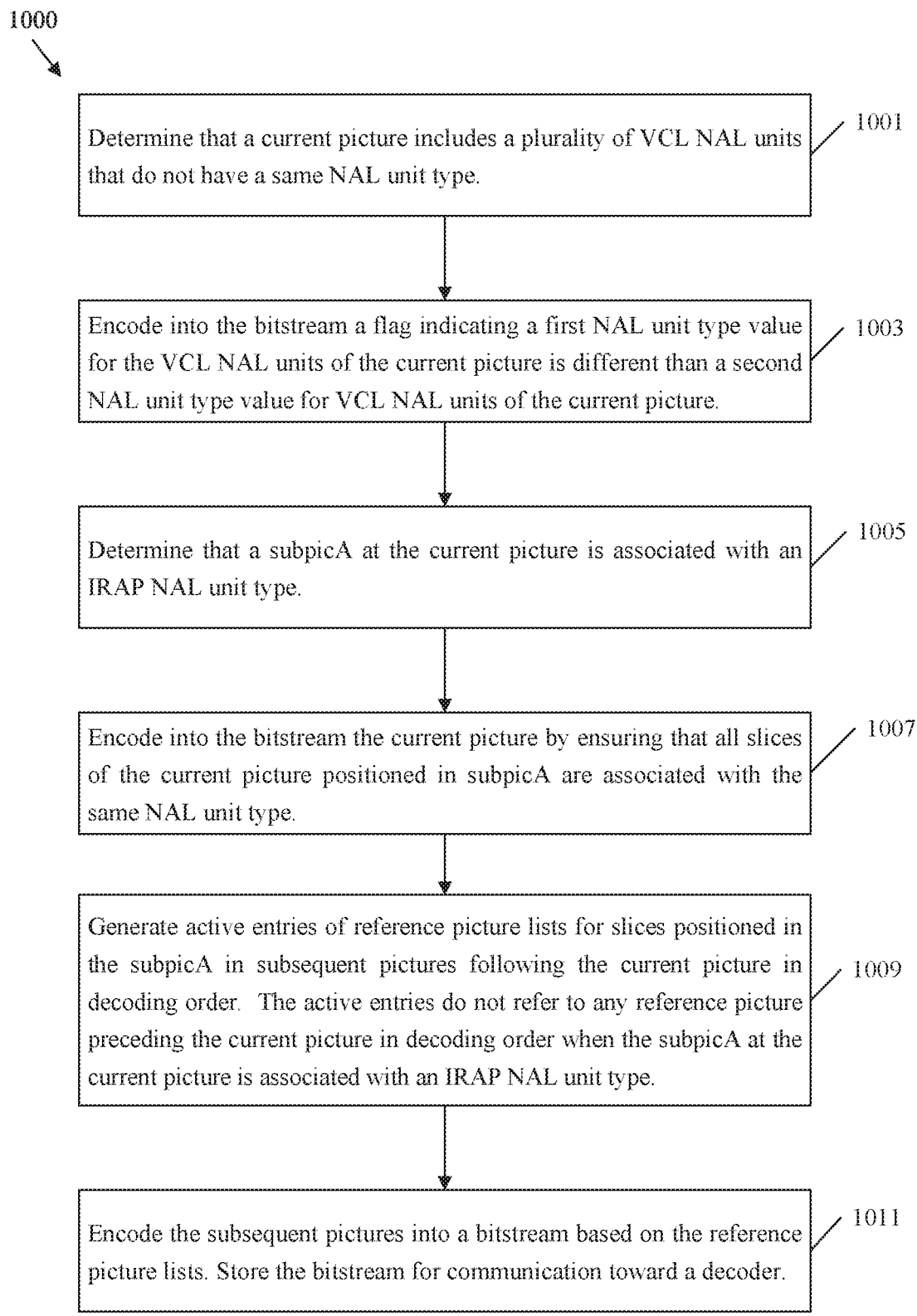
FIG. 10 is a flowchart of an example method of encoding a video sequence containing a picture with mixed NAL unit types into a bitstream.

FIG. 10 is a flowchart of an example method 1000 of encoding a video sequence containing a picture with mixed NAL unit types into a bitstream, such as a bitstream 800 containing a VR picture video stream 500 with a RPL structure 700. Method 1000 can encode such a bitstream according to constraints 600. Method 1000 may be employed by an encoder, such as a codec system 200, an encoder 300, and/or a video coding device 900 when performing method 100.

Method 1000 may begin when an encoder receives a video sequence including a plurality of pictures, such as VR pictures, and determines to encode that video sequence into a bitstream, for example based on user input. The bitstream may include VR video data. The VR video data may include pictures that each represent a sphere of content at a corresponding instant in the video sequence. The pictures may be partitioned into a set of sub-pictures. For example, each sub-picture may contain video data corresponding to a viewport of the VR video. Further, the various sub-pictures may contain IRAP NAL units and non-IRAP NAL units at varying frequencies. At step 1001, the encoder determines that a current picture includes a plurality of VCL NAL units that do not have a same NAL unit type. For example, the VCL NAL units may include an IRAP NAL unit with an IRAP NAL unit type and a non-IRAP NAL unit with a non-IRAP NAL unit type. For example, the IRAP NAL unit type may include an IDR NAL unit type or a CRA NAL unit type. Further, the non-IRAP NAL unit type may include a trailing NAL unit type, a RASL NAL unit type, and/or a RADL NAL unit type.

At step 1003, the encoder encodes a flag into the bitstream. The flag indicates a first NAL unit type value for the VCL NAL units of the current picture is different than a second NAL unit type value for VCL NAL units of the current picture. In an example, the flag can be encoded into a PPS in the bitstream. As a specific example, the flag may be a mixed_nalu_types_in_pic_flag 827. The mixed_nalu_types_in_pic_flag can be set equal to one when specifying that each picture referring to the PPS has more than one VCL NAL unit and the VCL NAL units do not have the same value of nal_unit_type.

At step 1005, the encoder determines that a subpicA at the current picture is associated with an IRAP NAL unit type. At step 1007, the encoder encodes the current picture into the bitstream. For example, the encoder ensures that all slices of the current picture positioned in subpicA are associated with the same NAL unit type (e.g., the IRAP NAL unit type). The encoder can encode subpicA according to intra-prediction. The encoder can also determine that a sub-picture B (subpicB) contains slices of the non-IRAP NAL unit type. Hence, the encoder can encode subpicB of the current according to inter-prediction.

At step 1009, the encoder can prepare to encode subsequent pictures following the current picture in decoding order. For example, the encoder can generate active entries of reference picture lists for slices positioned in the subpicA in the subsequent pictures. The active entries for a specified subsequent picture indicate pictures that can be used as reference pictures when performing inter-prediction encoding processes on the specified subsequent picture. Specifically, the active entries for subpicA in the subsequent pictures are constrained so that such active entries do not refer to any reference picture preceding the current picture in decoding order. This constraint is employed when the subpicA at the current picture is associated with the TRAP NAL unit type. This constraint ensures that slices in a sub-picture that follow an TRAP sub-picture do not reference pictures prior to the IRAP sub-picture, which would otherwise cause coding errors if the TRAP sub-picture were used as a random access point. The slices of the subsequent pictures that do not follow an TRAP sub-picture (e.g., that are positioned in a subpicB and follow a non-IRAP NAL unit) may continue to reference pictures that precede the current picture.

At step 1011, the encoder encodes the subsequent pictures into a bitstream based on the reference picture lists. For example, the encoder can encode the subsequent pictures based on inter-prediction and/or intra-prediction depending on the NAL types associated with the slices in the corresponding sub-pictures. The inter-prediction processes use the reference picture lists. The reference picture lists may include reference picture list zero and reference picture list one. Further, the reference picture lists may be coded in a reference picture list structure. The reference picture list structure may also be encoded into the bitstream. The encoder can also store the bitstream for communication toward a decoder.

Figure 11:
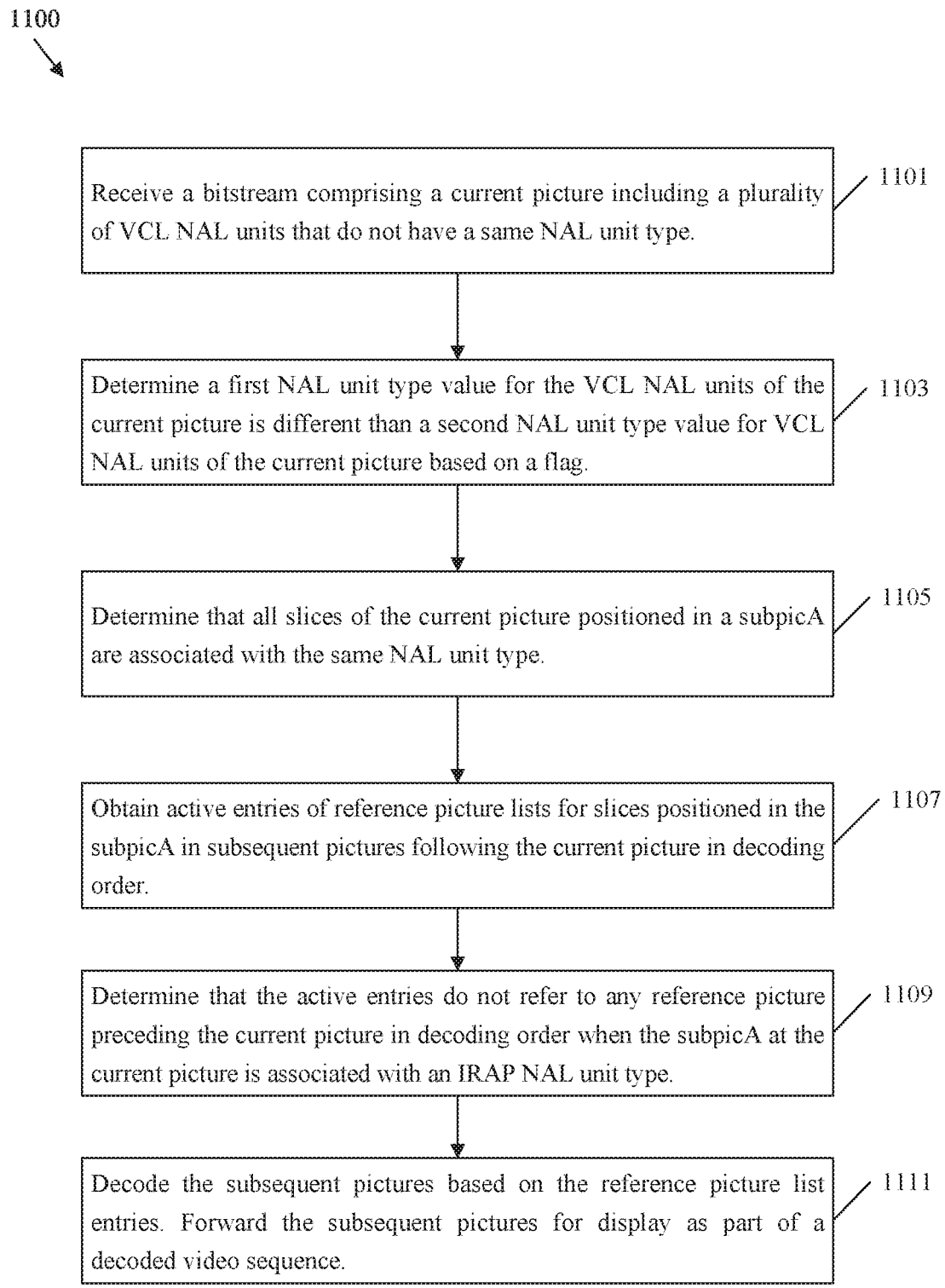
FIG. 11 is a flowchart of an example method of decoding a video sequence containing a picture with mixed NAL unit types from a bitstream.

FIG. 11 is a flowchart of an example method 1100 of decoding a video sequence containing a picture with mixed NAL unit types from a bitstream, such as a bitstream 800 containing a VR picture video stream 500 with a RPL structure 700. Method 1100 may decode such a bitstream according to constraints 600. Method 1100 may be employed by a decoder, such as a codec system 200, a decoder 400, and/or a video coding device 900 when performing method 100.

Method 1100 may begin when a decoder begins receiving a bitstream of coded data representing a video sequence, for example as a result of method 1000. The bitstream may include a VR video sequence including a plurality of pictures, such as VR pictures. The bitstream may include VR video data. The VR video data may include pictures that each represent a sphere of content at a corresponding instant in the video sequence. The pictures may be partitioned into a set of sub-pictures. For example, each sub-picture may contain video data corresponding to a viewport of the VR video. Further, the various sub-pictures may contain TRAP NAL units and non-IRAP NAL units at varying frequencies. At step 1101, the decoder receives the bitstream. The bitstream comprises a current picture including a plurality of VCL NAL units that do not have a same NAL unit type. For example, the VCL NAL units may include an IRAP NAL unit with an IRAP NAL unit type and a non-IRAP NAL unit with a non-IRAP NAL unit type. For example, the IRAP NAL unit type may include an IDR NAL unit type or a CRA NAL unit type. Further, the non-IRAP NAL unit type may include a trailing NAL unit type, a RASL NAL unit type, and/or a RADL NAL unit type.

At step 1103, the decoder determines that a first NAL unit type value for the VCL NAL units of the current picture is different than a second NAL unit type value for VCL NAL units of the current picture based on a flag. In an example, the bitstream may contain a PPS associated with the current picture. The flag can be obtained from the PPS. As a specific example, the flag may be a mixed_nalu_types_in_pic_flag 827. The mixed_nalu_types_in_pic_flag can be set equal to one when specifying that each picture referring to the PPS has more than one VCL NAL unit and the VCL NAL units do not have the same value of nal_unit_type.

At step 1105, the decoder can determine that all slices of the current picture positioned in a subpicA are associated with the same NAL unit type. The decoder can also decode subpicA and/or the current picture based on the NAL unit types of the slices. For example, the subpicA at the current picture may contain IRAP NAL units. In such a case, subpicA can be decoded according to intra-prediction. The decoder can also determine that a subpicB contains slices of the non-IRAP NAL unit type. Hence, the decoder can decode subpicB of the current according to inter-prediction.

At step 1107, the decoder can obtain active entries of reference picture lists for slices positioned in the subpicA in subsequent pictures following the current picture in decoding order. The active entries for a specified subsequent picture indicate pictures that can be used as reference pictures when performing inter-prediction decoding processes on the specified subsequent picture.

At step 1109, the decoder can determine that the active entries do not refer to any reference picture preceding the current picture in decoding order when the subpicA at the current picture is associated with an intra-random access point (TRAP) NAL unit type. This constraint ensures that slices in a sub-picture that follow an IRAP sub-picture do not reference pictures prior to the IRAP sub-picture, which would otherwise cause coding errors when the IRAP sub-picture is used as a random access point. The slices of the subsequent pictures that do not follow an IRAP sub-picture (e.g., that are positioned in a subpicB and follow a non-IRAP NAL unit) may continue to reference pictures that precede the current picture.

At step 1111, the decoder can decode the subsequent pictures based on the reference picture list active entries. For example, the decoder can decode the subsequent pictures based on inter-prediction and/or intra-prediction depending on the NAL types associated with the slices in the corresponding sub-pictures. The inter-prediction processes use the reference picture lists. The reference picture lists may include reference picture list zero and reference picture list one. Further, the reference picture lists may be obtained from a reference picture list structure that is coded into the bitstream. The decoder can the forward the current picture, the subsequent pictures, and/or sub-pictures thereof (e.g., subpicA or subpicB) for display as part of a decoded video sequence.

Figure 12:
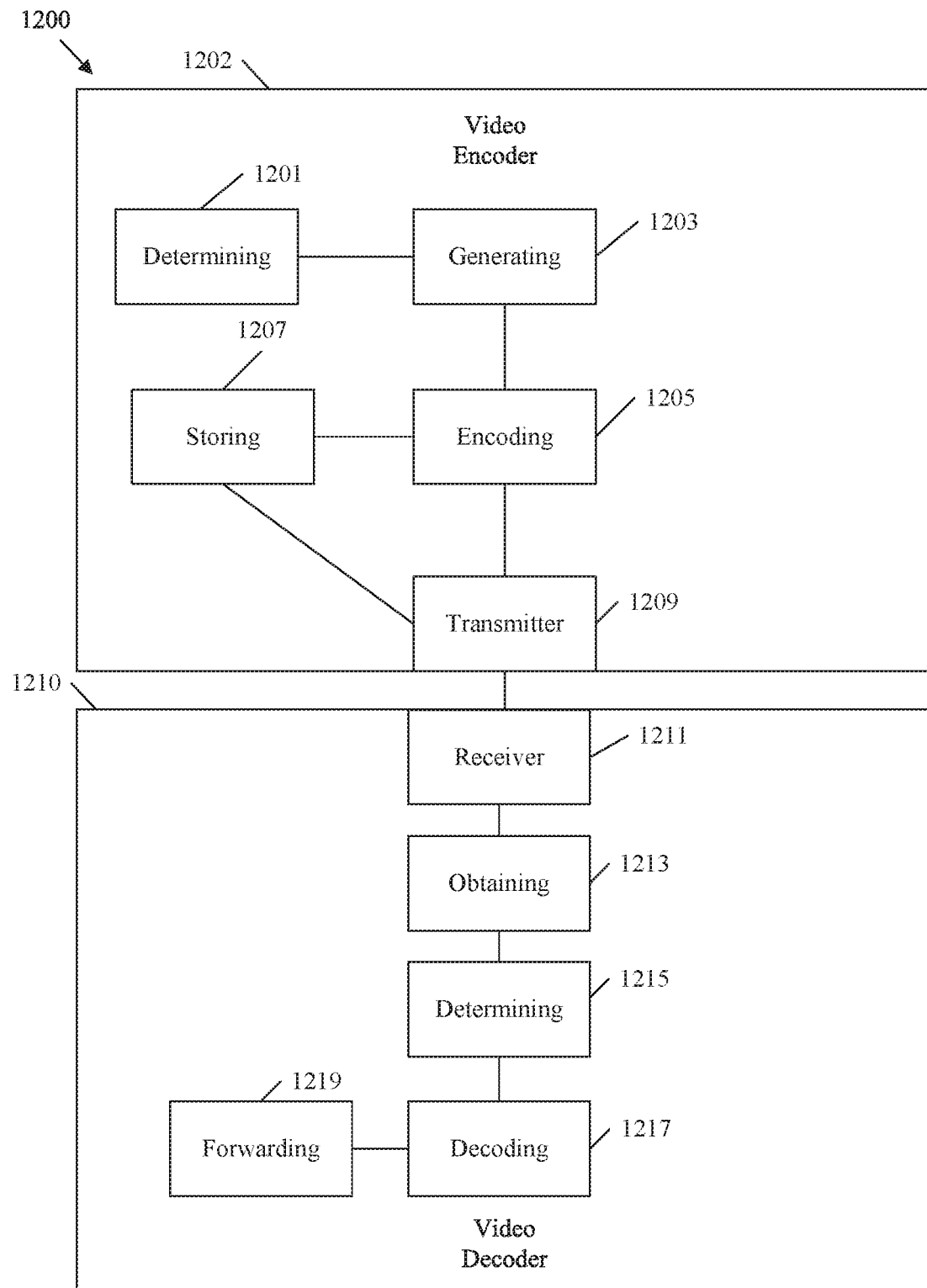
FIG. 12 is a schematic diagram of an example system for coding a video sequence containing a picture with mixed NAL unit types into a bitstream.

FIG. 12 is a schematic diagram of an example system 1200 for coding a video sequence containing a picture with mixed NAL unit types into a bitstream, such as a bitstream 800 containing a VR picture video stream 500 with a RPL structure 700 and coded according to constraints 600. System 1200 may be implemented by an encoder and a decoder such as a codec system 200, an encoder 300, a decoder 400, and/or a video coding device 900. Further, system 1200 may be employed when implementing method 100, 1000, and/or 1100.

The system 1200 includes a video encoder 1202. The video encoder 1202 comprises a determining module 1201 for determining that a current picture includes a plurality of VCL NAL units that do not have a same NAL unit type. The determining module 1201 is further for determining that a subpicA at the current picture is associated with an IRAP NAL unit type. The video encoder 1202 further comprises a generating module 1203 for generating active entries of reference picture lists for slices positioned in the subpicA in subsequent pictures following the current picture in decoding order, wherein the active entries do not refer to any reference picture preceding the current picture in decoding order when the subpicA at the current picture is associated with the IRAP NAL unit type. The video encoder 1202 further comprises an encoding module 1205 for encoding the subsequent pictures into a bitstream based on the reference picture lists. The video encoder 1202 further comprises a storing module 1207 for storing the bitstream for communication toward a decoder. The video encoder 1202 further comprises a transmitting module 1209 for transmitting the bitstream toward video decoder 1210. The video encoder 1202 may be further configured to perform any of the steps of method 1000.

The system 1200 also includes a video decoder 1210. The video decoder 1210 comprises a receiving module 1211 for receiving a bitstream comprising a current picture including a plurality of VCL NAL units that do not have a same NAL unit type. The video decoder 1210 further comprises an obtaining module 1213 for obtaining active entries of reference picture lists for slices positioned in a subpicA in subsequent pictures following the current picture in decoding order. The video decoder 1210 further comprises a determining module 1215 for determining that the active entries do not refer to any reference picture preceding the current picture in decoding order when the subpicA at the current picture is associated with an IRAP NAL unit type. The video decoder 1210 further comprises a decoding module 1217 for decoding the subsequent pictures based on the reference picture list active entries. The video decoder 1210 further comprises a forwarding module 1219 for forwarding the subsequent pictures for display as part of a decoded video sequence. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
    receiving a bitstream comprising a current picture that has more than one video coding layer (VCL) network abstraction layer (NAL) units that do not have a same NAL unit type;
    obtaining active entries of reference picture lists for slices positioned in a sub-picture A (subpicA) in subsequent pictures following the current picture in decoding order, wherein the active entries do not include a reference to any reference picture preceding the current picture in decoding order when the subpicA at the current picture is associated with an intra-random access point (IRAP) NAL unit type, wherein all slices of the current picture positioned in subpicA are associated with the same NAL unit type; and
    decoding the subsequent pictures based on the reference picture list active entries.

2. The method of claim 1, wherein the IRAP NAL unit type is a clean random access (CRA) NAL unit type.

3. The method of claim 1, wherein the IRAP NAL unit type is an instantaneous decoder refresh (IDR) NAL unit type.

4. The method of claim 1, further comprising determining a first NAL unit type value for the VCL NAL units of the current picture is different than a second NAL unit type value for VCL NAL units of the current picture based on a flag.

5. The method of claim 4, wherein the bitstream includes a picture parameter set (PPS), and wherein the flag is obtained from the PPS.

6. The method of claim 5, wherein the flag is a mixed_nalu_types_in_pic_flag, and wherein the mixed_nalu_types_in_pic_flag is equal to one when specifying that each picture referring to the PPS has more than one VCL NAL unit and the VCL NAL units do not have the same value of NAL unit type (nal_unit_type).

7. A method implemented by an encoder, the method comprising:
    determining that a current picture includes a plurality of video coding layer (VCL) network abstraction layer (NAL) units that do not have a same NAL unit type;
    determining that a sub-picture A (subpicA) at the current picture is associated with an intra-random access point (IRAP) NAL unit type;
    generating active entries of reference picture lists for slices positioned in the subpicA in subsequent pictures following the current picture in decoding order, wherein the active entries do not include a reference to any reference picture preceding the current picture in decoding order when the subpicA at the current picture is associated with the IRAP NAL unit type, wherein all slices of the current picture positioned in subpicA are associated with the same NAL unit type; and
    encoding the subsequent pictures into a bitstream based on the reference picture lists.

8. The method of claim 7, wherein the IRAP NAL unit type is a clean random access (CRA) NAL unit type.

9. The method of claim 7, wherein the IRAP NAL unit type is an instantaneous decoder refresh (IDR) NAL unit type.

10. The method of claim 7, further comprising encoding into the bitstream, by the encoder, a flag indicating a first NAL unit type value for the VCL NAL units of the current picture is different than a second NAL unit type value for VCL NAL units of the current picture.

11. The method of claim 10, wherein the flag is encoded into a picture parameter set (PPS) in the bitstream.

12. The method of claim 11, wherein the flag is a mixed_nalu_types_in_pic_flag, and wherein the mixed_nalu_types_in_pic_flag is set equal to one when specifying that each picture referring to the PPS has more than one VCL NAL unit and the VCL NAL units do not have the same value of NAL unit type (nal_unit_type).

13. A video coding device comprising:
a receiver configured to receive a bitstream comprising a current picture that has more than one video coding layer (VCL) network abstraction layer (NAL) units that do not have a same NAL unit type;
a processor coupled to the receiver and configured to:
obtain active entries of reference picture lists for slices positioned in a sub-picture A (subpicA) in subsequent pictures following the current picture in decoding order, wherein the active entries do not include a reference to any reference picture preceding the current picture in decoding order when the subpicA at the current picture is associated with an intra-random access point (IRAP) NAL unit type, wherein all slices of the current picture positioned in subpicA are associated with the same NAL unit type; and
decode the subsequent pictures based on the reference picture list active entries.

14. The video coding device of claim 13, wherein the IRAP NAL unit type is a clean random access (CRA) NAL unit type.

15. The video coding device of claim 13, wherein the IRAP NAL unit type is an instantaneous decoder refresh (IDR) NAL unit type.

16. The video coding device of claim 13, wherein the processor is further configured to determine a first NAL unit type value for the VCL NAL units of the current picture is different than a second NAL unit type value for VCL NAL units of the current picture based on a flag.

17. The video coding device of claim 16, wherein the bitstream includes a picture parameter set (PPS), and wherein the flag is obtained from the PPS.

18. The video coding device of claim 17, wherein the flag is a mixed_nalu_types_in_pic_flag, and wherein the mixed_nalu_types_in_pic_flag is equal to one when specifying that each picture referring to the PPS has more than one VCL NAL unit and the VCL NAL units do not have the same value of NAL unit type (nal_unit_type).

* * * * *

UNITED STATES PATENT AND TRADEMARK OFFICE
CERTIFICATE OF CORRECTION

PATENT NO. : 12,041,249 B2  
APPLICATION NO. : 17/568517  
DATED : July 16, 2024  
INVENTOR(S) : Ye-Kui Wang et al.

Page 1 of 1

It is certified that error appears in the above-identified patent and that said Letters Patent is hereby corrected as shown below:

On the Title Page

Page 2, item (56) Other Publications, Second Column:
Delete "Bross, et al., "Versatile Video Coding (Draft 5)," Joint Video Experts Team (JVET) of ITU-T SG 16 WP 3 and ISO/IEC ITC 1/SC 29/WG 11, 14th Meeting: Geneva, CH, Mar. 19-27, 2019, JVET-N1001-v10, 407 pages."
And insert:
-- Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v10, 407 pages. --

In the Claims

Column 42, Claim 10, Lines 61-65, should read:
10. The method of claim 7, further comprising encoding into the bitstream a flag indicating a first NAL unit type value for the VCL NAL units of the current picture is different than a second NAL unit type value for VCL NAL units of the current picture.

Signed and Sealed this  
Twenty-fourth Day of September, 2024

Katherine Kelly Vidal  
*Director of the United States Patent and Trademark Office*